(12) United States Patent  
Tuchman et al.

(10) Patent No.: US 9,183,203 B1  
(45) Date of Patent: Nov. 10, 2015

(54) GENERALIZED DATA MINING AND ANALYTICS APPARATUSES, METHODS AND SYSTEMS

(75) Inventors: Ari Tuchman, Palo Alto, CA (US); Yaron Galant, Palo Alto, CA (US); Erich Nachbar, Foster City, CA (US); John Stockton, Redwood City, CA (US); Karthik Thiyagarajan, Palo Alto, CA (US)

(73) Assignee: Quantifind, Inc., Menlo Park, CA (US)

( * ) Notice: Subject to any disclaimer, the term of this patent is extended or adjusted under 35 U.S.C. 154(b) by 101 days.

(21) Appl. No.: 13/252,559

(22) Filed: Oct. 4, 2011

Related U.S. Application Data

(63) Continuation-in-part of application No. 12/496,199, filed on Jul. 1, 2009, now Pat. No. 8,756,229, and a continuation-in-part of application No. 12/754,249, filed on Apr. 5, 2010, now Pat. No. 8,275,747.

(51) Int. Cl.  
*G06F 17/30* (2006.01)

(52) U.S. Cl.  
CPC ...... *G06F 17/30011* (2013.01); *G06F 17/3061* (2013.01)

(58) Field of Classification Search  
CPC .................. G06F 17/30038; G06F 17/30861; G06F 17/30011; G06F 17/3061  
USPC ......... 707/640, 609, 791, 802, 821, 759, 713, 707/769, 999.005  
See application file for complete search history.

(56) References Cited

U.S. PATENT DOCUMENTS

| | | | | |
|---|---|---|---|---|
| 5,991,714 | A * | 11/1999 | Shaner | 704/9 |
| 6,629,097 | B1 * | 9/2003 | Keith | 1/1 |
| 6,665,661 | B1 * | 12/2003 | Crow et al. | 1/1 |
| 6,886,010 | B2 * | 4/2005 | Kostoff | 1/1 |
| 7,593,932 | B2 * | 9/2009 | Lindh et al. | 1/1 |
| 2004/0064438 | A1 * | 4/2004 | Kostoff | 707/1 |
| 2005/0080769 | A1 * | 4/2005 | Gemmell et al. | 707/3 |
| 2005/0198027 | A1 * | 9/2005 | Hamaguchi | 707/5 |
| 2006/0106851 | A1 * | 5/2006 | Warshawsky | 707/101 |
| 2007/0106658 | A1 * | 5/2007 | Ferrari et al. | 707/5 |
| 2008/0183697 | A1 * | 7/2008 | Narahara et al. | 707/5 |
| 2008/0270386 | A1 * | 10/2008 | Ohi et al. | 707/5 |
| 2009/0077009 | A1 * | 3/2009 | Miszczyk et al. | 707/2 |

* cited by examiner

*Primary Examiner* — Shiow-Jy Fan  
(74) *Attorney, Agent, or Firm* — Irell & Manella LLP

(57) ABSTRACT

The GENERALIZED DATA MINING AND ANALYTICS APPARATUSES, METHODS AND SYSTEMS ("GDMA"), in various embodiments, may identify statistical relationships among query terms by analyzing a corpus of electronic documents. Inputs may be automatically generated automatically and/or user provided. In one embodiment, a method includes: accessing a term tensor associated with at least one term in a corpus of documents, wherein the term tensor comprises a plurality of data type vectors corresponding respectively to a plurality of term-correlated data types correlated with the at least one term in the corpus and each data type vector comprising a plurality of binned data type values with corresponding weighted occurrence values derived from the corpus; providing at least one of the plurality of term-correlated data types for selectable display; receiving at least one term-correlated data type selection; and providing data type values associated with the at least one term-correlated data type selection for display.

25 Claims, 22 Drawing Sheets

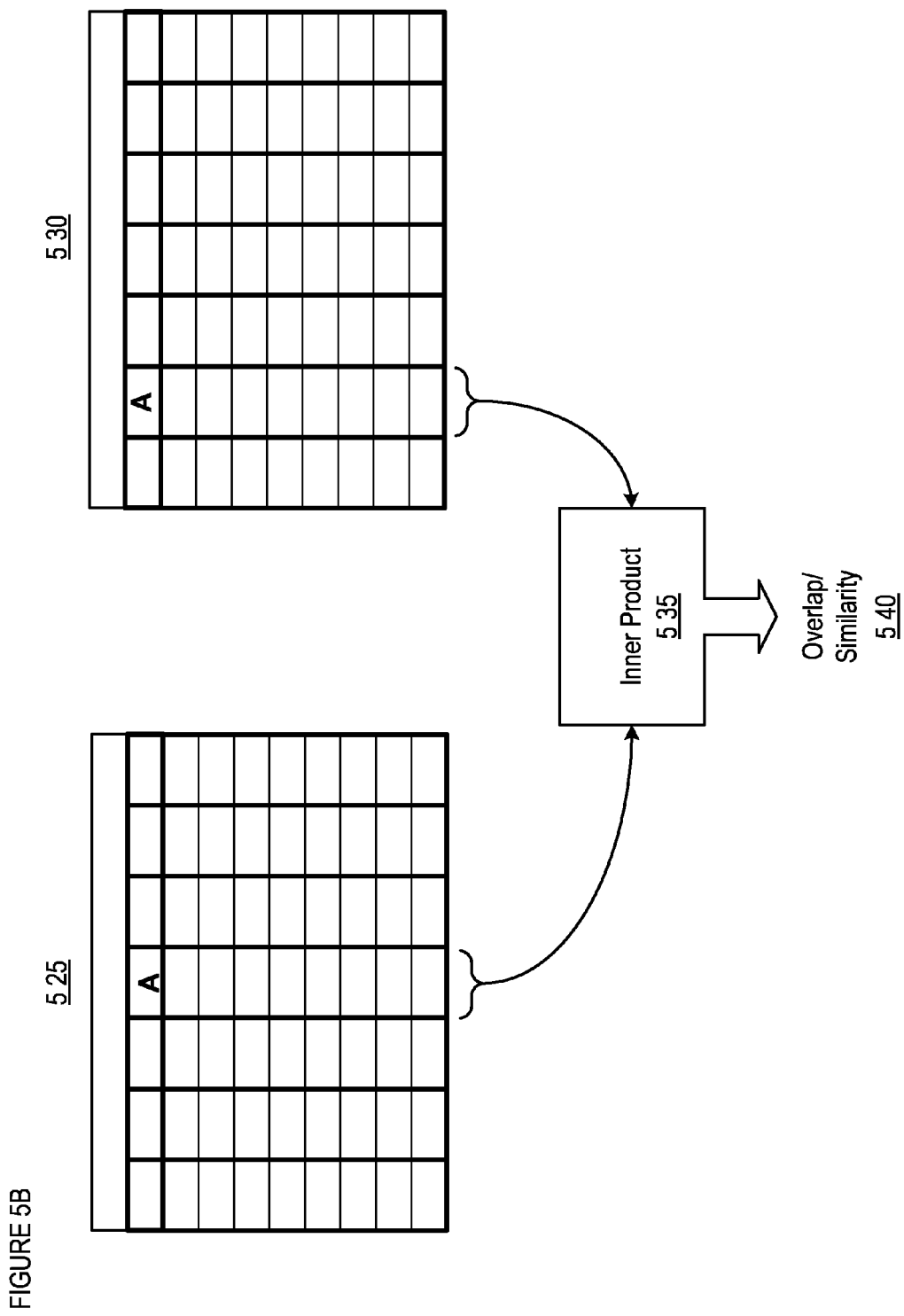

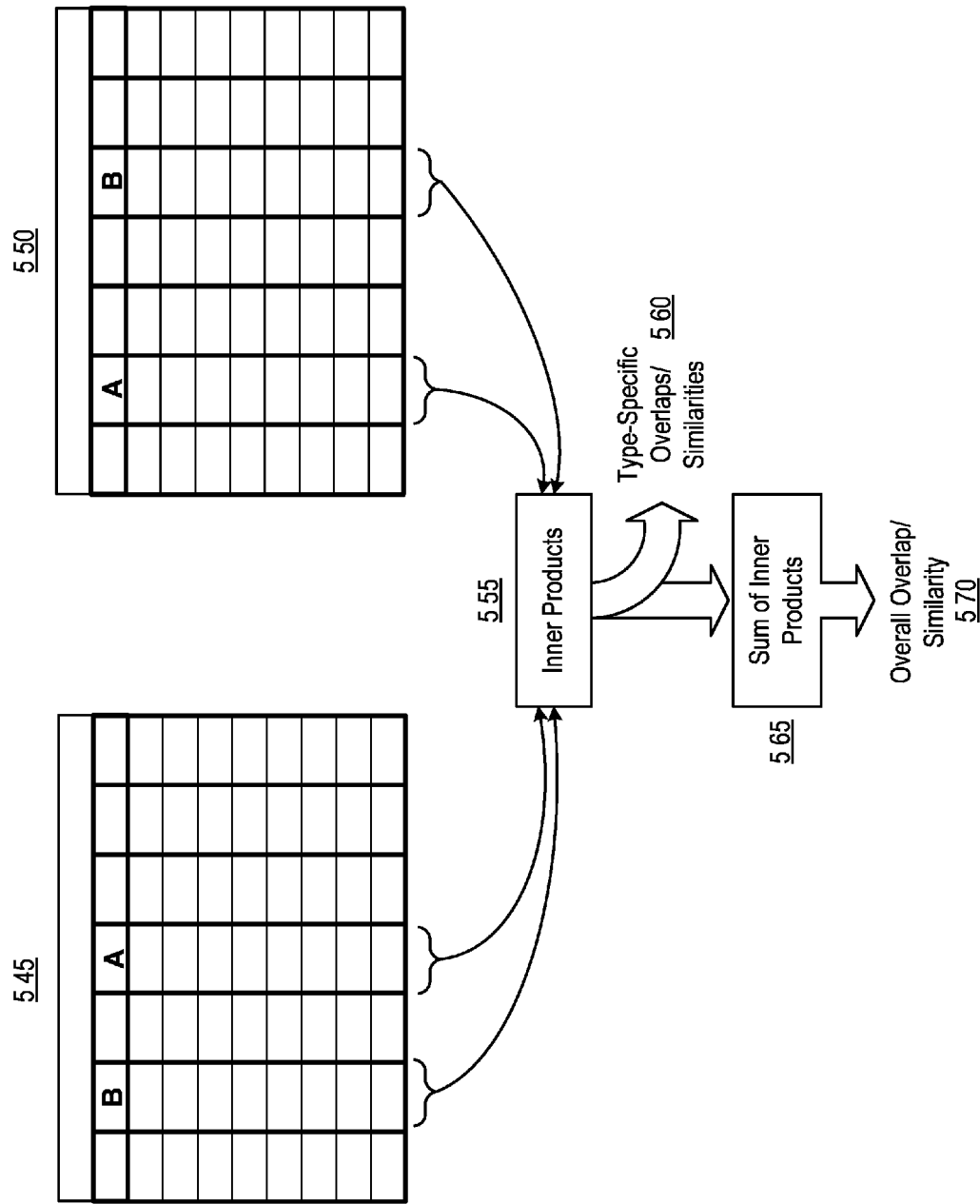

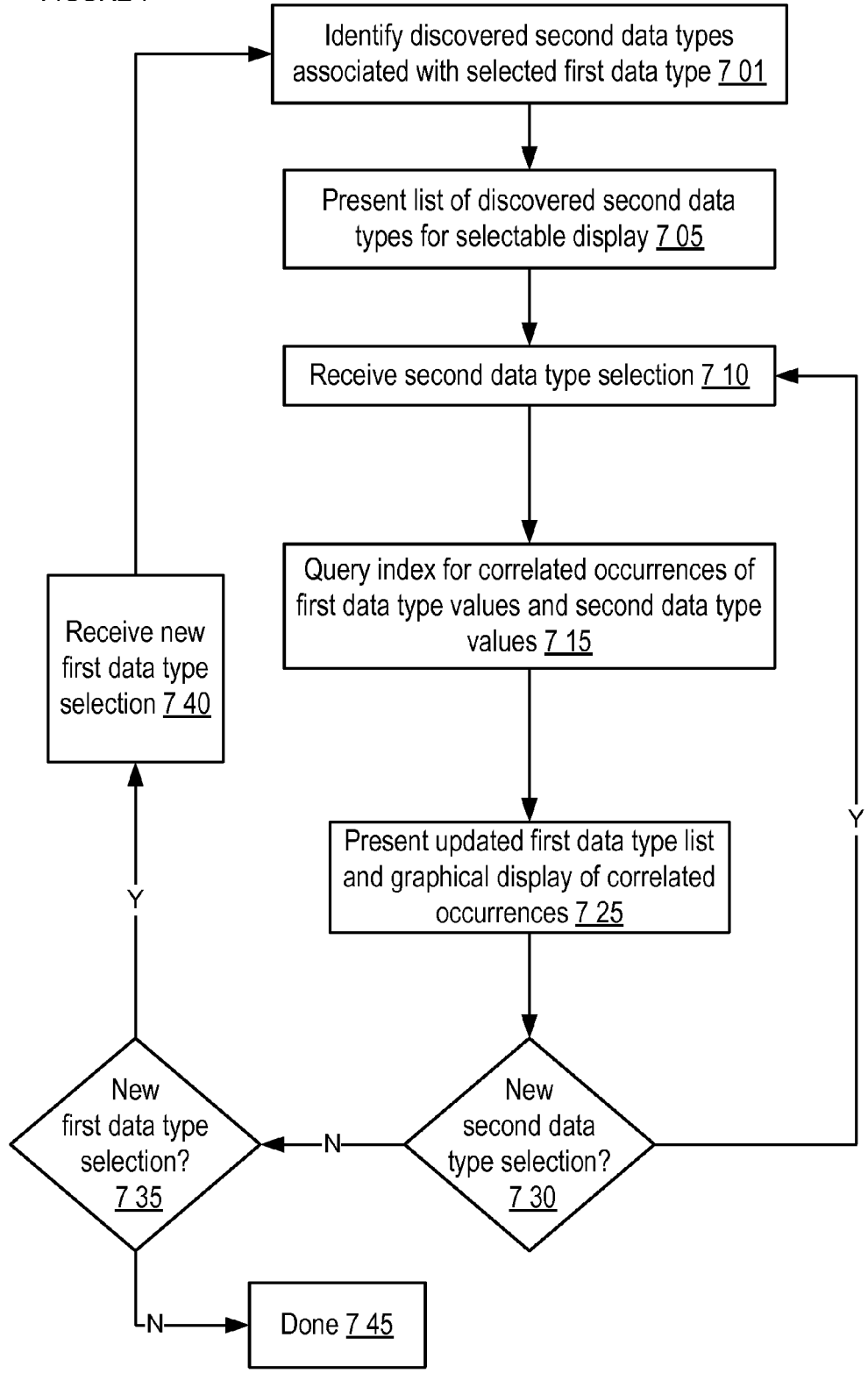

GENERALIZED DATA MINING AND ANALYTICS APPARATUSES, METHODS AND SYSTEMS

PRIORITY CLAIMS AND RELATED APPLICATIONS

This is a Continuation-In-Part of and claims priority under 35 U.S.C. §120 to prior U.S. non-provisional patent application Ser. No. 12/496,199 filed Jul. 1, 2009, entitled, "SYSTEM AND METHODS FOR UNITS-BASED NUMERIC INFORMATION RETRIEVAL," and to prior United States non-provisional patent application Ser. No. 12/754,249 filed Apr. 5, 2010, entitled, "AUTOMATED UNIT FINDING FOR NUMERIC INFORMATION RETRIEVAL."

The entire contents of the aforementioned applications are herein expressly incorporated by reference.

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations are directed generally to information retrieval, and more particularly, to GENERALIZED DATA MINING AND ANALYTICS APPARATUSES, METHODS AND SYSTEMS.

BACKGROUND

Search engines have come about, allowing users to enter search tokens into one or more text fields. Those search tokens may then be formed into query statements, which may be used to query a database and return search results to the user. The tokens may be sent to a server that forms the query statements and returns a static and selectable list of results to the user, allowing the user to select a desired link and navigate to a desired search result.

SUMMARY

The rapid adoption of data collection technologies coupled with the reduction of data storage costs have led to an exponential growth in the size of enterprise and consumer databases and the increasing need for novel approaches to extract meaningful and actionable insights from these corpora. Furthermore, often the analyst or researcher who is attempting to extract emerging trends or insights from a corpus is not aware of exactly what they are looking for. Therefore there is a need for data mining apparatuses that can find meaningful insights from massive corpora consisting of both structured and unstructured data.

The GENERALIZED DATA MINING AND ANALYTICS APPARATUSES, METHODS AND SYSTEMS (hereinafter "GDMA") returns to the analyst, researcher, and/or other user novel insights from a corpus and discovers insights from the data that the user may not have known to look for.

In various embodiments, the GDMA may leverage a data structure comprising a series of term tensors, where terms such as entities, phrases, numeric units, and/or the like are associated with vectors comprising data of a specific type determined to be contextually related to the terms. Such term tensors and vectors may be used to identify what is new and interesting in the corpus, even when domain-specific ontologies are unknown, and presents results to the user via GDMA outputs which, in various embodiments, may include numerical results and/or statistical relationships among entities or terms as determined based on analysis of a corpus of electronic documents. In one embodiment, the GDMA may recognize novel trends, relationships, clusters, outliers, phrase occurrences, deviations from historical baseline, and/or the like to automatically present to the user what is new and/or different in the corpus. In one implementation, such results may be presented to a user via a summary dashboard. In some implementations, such results may be determined automatically from the corpus with no user input, or from a predefined list of terms provided by the user which may be automatically run as queries by the GDMA at a time frequency determined by the user.

In another embodiment, a corpus query processor-implemented method is disclosed, comprising: receiving an electronic query comprising at least one query term; identifying a query type associated with the at least one query term; selecting at least one computer-searchable index based on the query type, comprising a plurality of searchable index entries associated with related occurrences of query terms in a corpus of source documents; querying the at least one searchable index based on the at least one query term to retrieve at least one term tensor comprising a plurality of type vectors, wherein each type vector comprises a collection of type values collected from a corpus of analyzed electronic documents for types correlated with the query term in the corpus of analyzed electronic documents; and providing at least one collection of type values from the term tensor for display.

BRIEF DESCRIPTION OF THE DRAWINGS

The accompanying appendices and/or drawings illustrate various non-limiting, example, innovative aspects in accordance with the present descriptions:

FIGS. 5A-5D show schematic illustrations of term tensors and term tensor similarity determinations in embodiments of GDMA operation;

FIG. 7 shows an implementation of logic flow for correlated data representation in one embodiment of GDMA operation;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

This disclosure details aspects of GENERALIZED DATA MINING AND ANALYTICS APPARATUSES, METHODS AND SYSTEMS (hereinafter "GDMA"). In various embodiments, the GDMA may facilitate a wide variety of different uses, such as but not limited to: retrieving numerical and/or non-numerical data, trends, relationships, and/or the like from a corpus of structured and/or unstructured electronic documents; identifying similarities and/or differences for selected characteristics related to query terms; pattern-based searching and/or query refinement based on graphical interface selections; open-ended and/or endpoint-constrained traversal-mode searching; highlighting and/or suppressing outliers and/or deviations from trends, averages, means, external data, and/or the like; alerts and/or associated actions based on occurrence of data points, trends, patterns, and/or the like; discrimination of relationships, trends, patterns, and/or the like; quantitative sentiment analysis; anonymization; automated optimization and/or refinement of search results based on result trends and/or patterns; and/or the like. It is to be understood that, depending on the particular needs and/or characteristics of a GDMA user, document corpus, data resource, system architecture, processor capability, data transmission capability and/or network framework, and/or the like, various embodiments of the GDMA may be implemented that facilitate a great deal of flexibility and customization. The instant disclosure discusses embodiments primarily within the context of electronic document analysis and information retrieval. However, it is to be understood that the systems described herein may be readily configured and/or customized for a wide variety of other applications and/or implementations. For example, aspects of the GDMA may be configured for analyzing form inputs, data feeds, images, detected and/or recorded sounds, and/or the like; facilitating natural language queries; result quality analysis and/or diagnostics; and/or the like. It is to be understood that the GDMA may be further adapted to other implementations and/or document analysis and information retrieval applications.

Figure 1:
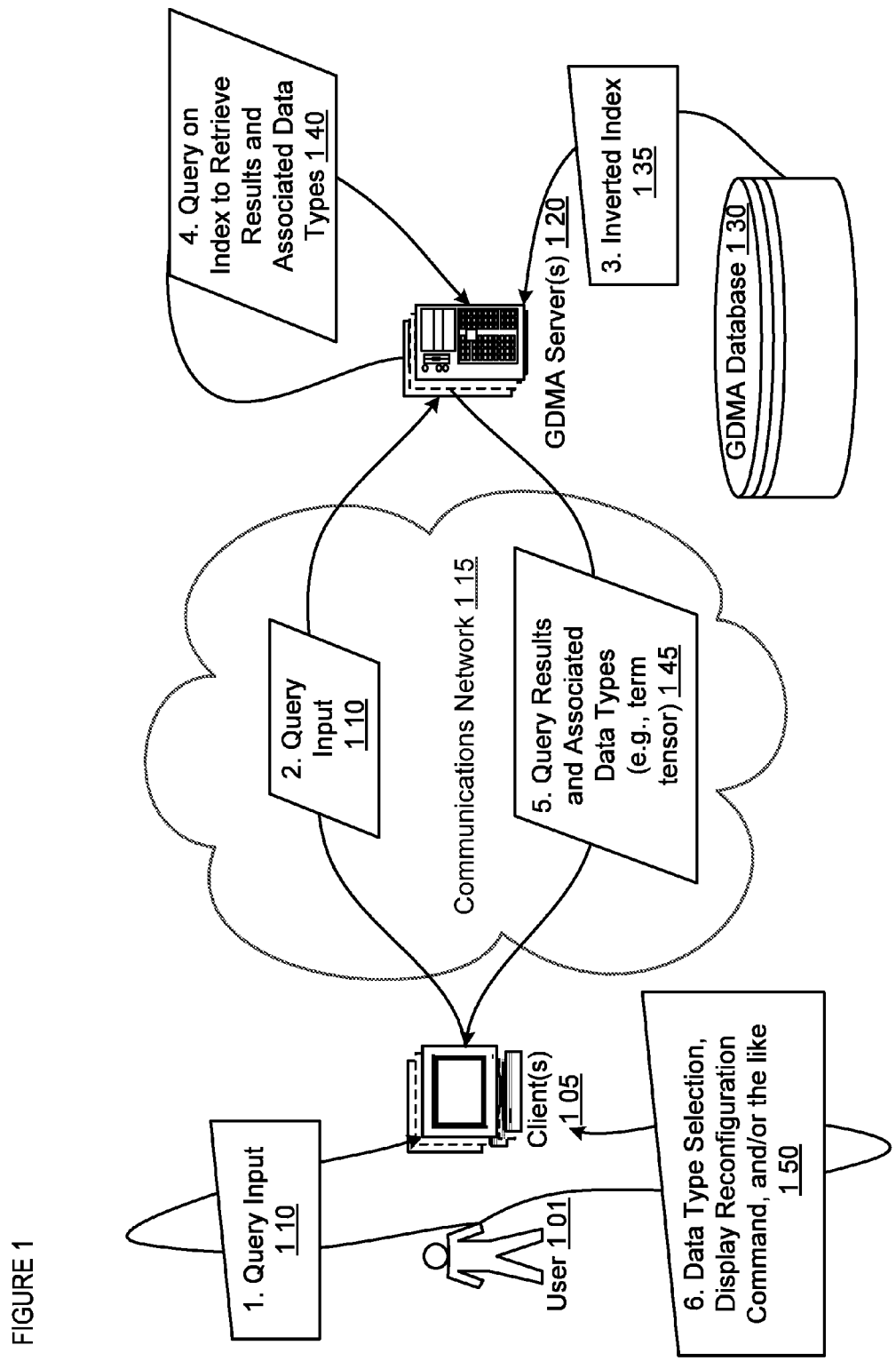
FIG. 1 shows an implementation of data flow between and among GDMA components and/or affiliated entities in one embodiment of GDMA operation.

FIG. 1 shows an implementation of data flow between and among GDMA components and/or affiliated entities in one embodiment of GDMA operation. In some implementations, a user 101 may desire to retrieve information by engaging a client device 105 and entering one or more query inputs 110. It should be noted that, although for purposes of illustration FIG. 1 shows embodiments in which query inputs originate with a user, the GDMA is configurable for other embodiments in which a query does not originate with an actual user. For example, in one embodiment, the GDMA may automatically identify entities and/or phrases with new, different, emerging, and/or the like behavior and automatically configure such entities and/or phrases as query inputs. In such an embodiment, a first-run analysis of the entire corpus may be employed to automatically determine possible query terms. A query input no may include, for example, a keyword, numerical value, unit, data trend, data pattern, and/or the like. In some implementations, the query input (whether generated by an actual user or automatically determined by the GDMA) may comprise multiple keywords, entities, patterns, and/or the like which may be analyzed in combination with one or more Boolean relationships between the terms and/or may be analyzed individually in parallel, for which different results may be presented for each term. The query input 110 may then be transmitted, such as via a communications network 115, to one or more GDMA servers 120 which, in turn, may access one or more GDMA databases 130 to retrieve at least one inverted index 135, which may be selected based on the query input 110. Alternatively, the query may be automatically generated by the GDMA and/or at the GDMA servers themselves. A query statement may be constructed based on the query input no and used to query the at least one inverted index 135 to generate query results and/or associated data types 145, which may then be communicated to the client terminal 105, such as via a communications network 115. In one implementation, query results and associated data types may include presentation of one or more term tensors derived from the index structure, each comprising a collection of data types associated with a given term, and vectors associated with each data type comprising binned values associated with a given data type and term. Further detail regarding the generation, structure and application of term tensors and/or term tensor components is provided herein below, as well as in co-pending application Ser. No. 12/496,199 filed Jul. 1, 2009, entitled, "SYSTEM AND METHOD FOR UNITS-BASED NUMERIC INFORMATION RETRIEVAL," and application Ser. No. 12/754,249 filed Apr. 5, 2010, entitled, "AUTOMATED UNIT FINDING FOR NUMERIC INFORMATION," both of which are incorporated in their entirety herein by reference. In one implementation, a user may submit further information and/or requests, such as selection of a data type, reconfiguration of display options, and/or the like 150, which may result in reconfiguration of the user interface ("UI") and/or selection of different subsets of received data at the client terminal 110, and/or may result in the generation of one or more new query inputs for GDMA server 120 processing. In another implementation, the GDMA may automatically suggest to the user to examine a particular data type, where that data type has been automatically determined to possess and/or exhibit new, different, interesting, and/or the like properties. In another implementation, the GDMA may automatically determine the newest phrases, entities, terms, and/or the like appearing in the corpus, construct term tensors for those items, present those term tensors and/or some components thereof directly to the user, and/or the like.

Figure 2:
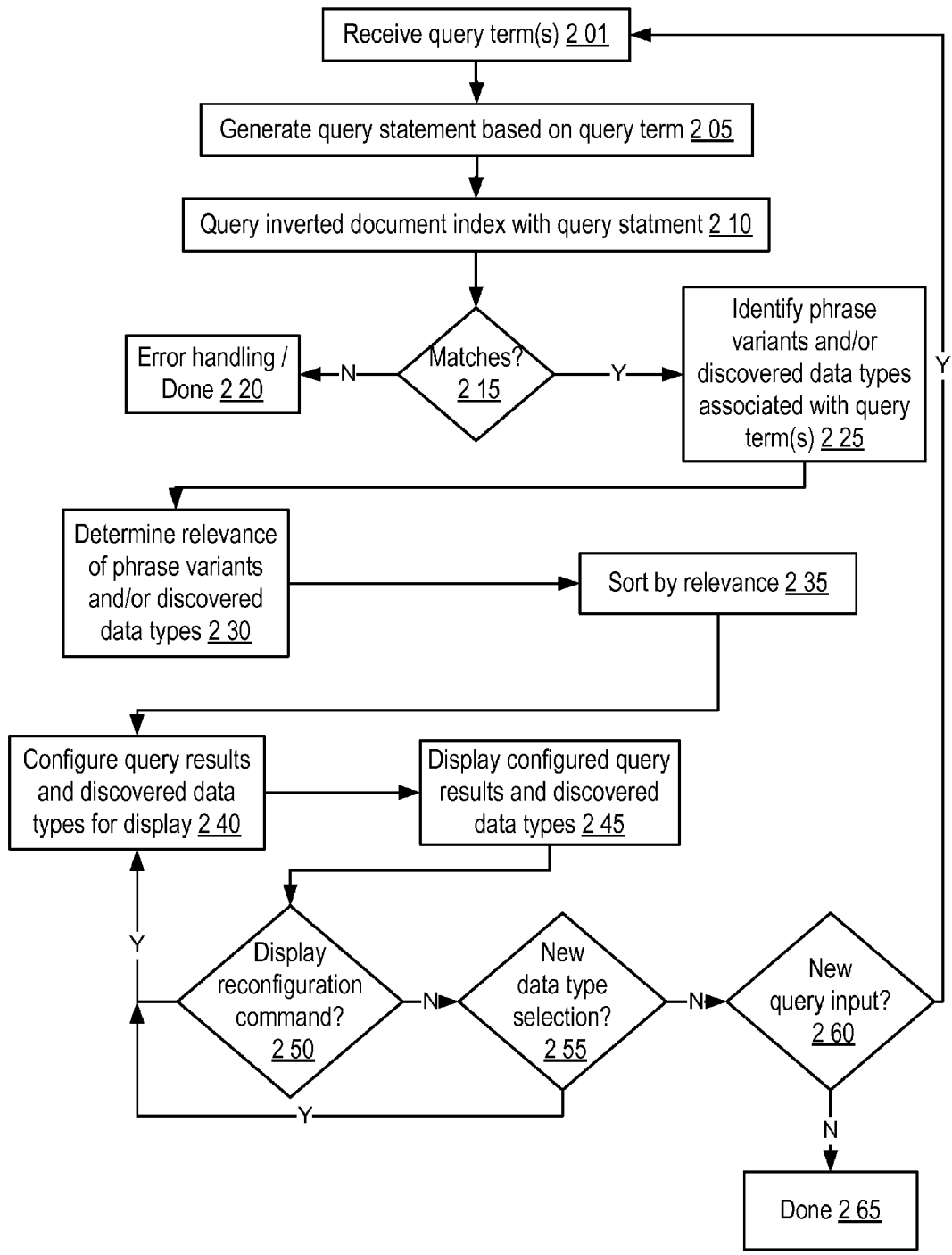
FIG. 2 shows an implementation of query processing logic flow in one embodiment of GDMA operation.

FIG. 2 shows an implementation of query processing logic flow in one embodiment of GDMA operation. Query terms may be received 201, such as but not limited to: keywords, numeric values or ranges, unit identifiers, source identifiers, and/or the like and/or strings thereof, and where query terms may be provided by user or determined automatically by the GDMA. The GDMA may then generate a query statement based on the received query terms 205. For example, in one implementation, the GDMA may parse input query terms in order to identify terms as keywords, numerical values or ranges, unit identifiers, source identifiers, and/or the like. An inverted document index, reflecting information and/or relationships between terms, data types, numerical values and/or ranges, and/or the like, may then be queried using the generated query statement 210. In one implementation, the inverted index queried at 210 may be selected based on query terms received and/or automatically generated at 201 and/or the generated query statement at 205. For example, different inverted indices associated with term identifiers (e.g., keywords, numerical values, units, and/or the like) may be stored and accessed as needed based on the term identifiers associated with a given query input and/or generated query statement. A determination may be made 215 as to whether any matching records and/or other data exist in response to the query at 210 and, if no results are found, then an error handling procedure may be undertaken 220, such as to notify the requesting user of the lack of results, reconfiguring the query statement, selecting a different inverted index, and/or the like.

If a match is found at 215, the GDMA may identify phrase variants and/or discovered data types associated with the query terms based on the query 225. For example, if the query term received at 201 is the anticoagulant drug "Warfarin," the GDMA may identify data types related to and/or correlated with that term in the corpus of analyzed documents, such as "gram second^-1" (which may be indicative of a dosage rate for the drug), "gram/m^3" (which may be indicative of a density associated with the drug), and/or the like.

In one implementation, a GDMA server may configure retrieved results as a term tensor, which may comprise a plurality of type vectors, wherein each type vector may comprise a collection of type values collected from a corpus of analyzed electronic documents for types correlated with the query term in the corpus of analyzed electronic documents. In one implementation, such a term tensor may be provided to a client terminal device, where further display configuration may take place. In another implementation, some or all of the display configuration may occur at the GDMA server, and the term tensor and display configuration instructions may then be supplied to the client terminal for user display.

The GDMA may further identify one or more phrase variants of the query term (e.g., "warfarin group," "warfarin therapy," "oral warfarin," and/or the like), which may, in one implementation, be indicative of phrases containing the query term that occur in the corpus of analyzed documents. In one implementation, only those data types and/or phrase variants having the greatest correlation with the query term (e.g., greater than a lower cutoff) and/or occurring most frequently in association therewith may be identified and/or otherwise included by the GDMA at 225. In one implementation, a correlation may be established as a weighted sum of occurrences of the data type and/or phrase variant in association with the query term in the document corpus, where each occurrence is weighted according to weighting factors, such as, but not limited to: the proximity between the query term and type/variant; presence of punctuation or other delimiting characters between the query term and type/variant; presence of other query terms, types, variants, and/or the like between the query term and the type/variant; presence of prepositions or other parts of speech indicative of a relationship (e.g., based on natural language processing or "NLP" techniques) that occur between the query term and the type/variant; frequency of occurrence of a given type value and/or phrase variant; presence of an intervening phrase or other syntactic structure between the query term and the type/phrase; and/or the like. Further details surrounding the identification of data types, phrase variants, and/or the like as they relate to query inputs, query terms, search terms, and/or the like is provided below and in co-pending application Ser. No. 12/496,199 filed Jul. 1, 2009, entitled, "SYSTEM AND METHOD FOR UNITS-BASED NUMERIC INFORMATION RETRIEVAL," and application Ser. No. 12/754,249 filed Apr. 5, 2010, entitled, "AUTOMATED UNIT FINDING FOR NUMERIC INFORMATION," both of which are incorporated in their entirety herein by reference.

In one implementation, the GDMA may construct a term tensor related to the query term. Such a term tensor may comprise vectors of different categories and/or types of data related to the query term, where each vector may contain all values of that data type determined to be contextually related to the query term.

The GDMA may determine the relevance of all terms and/or discovered data types to the received query inputs 230. In one implementation, relevance may be determined as and/or based on the correlation between the query term and the discovered data type and/or phrase variant, as described above. The GDMA may then sort results of data types (e.g., the vectors that comprise the term tensor generated in response to the query) by relevance 235 (e.g., such that a term of a specific data type that occurs near the query term in many documents, without intervening punctuation, noun phrases, and/or the like will be ranked higher than a term of a data type that occurs near the query term only in a few documents, and often with punctuation separation, noun phrase separation, and/or the like). The GDMA may then configure the query results 240, which may include values, numerical or otherwise, for one or more of the discovered data types and/or for phrase variants (e.g., in one implementation, phrase variants may be the default selection, and the GDMA may retrieve correlation values for different phrase variants for display). The GDMA may further configure the list of discovered data types and/or phrase variants themselves for display in conjunction with the display of values for the default and/or selected types/variants. In one implementation, correlated types/variants may be configured as an ordered list, where the position of each type/variant in the list is determined according to the relative correlation values associated with each type/variant. In various other implementations, the GDMA may present relevance and/or correlation information for discovered data types and/or phrase variants in any of a wide variety of other ways, such as, but not limited to, by shading the types/variants; by color; by size of type/variant identifiers and/or icons; by position of type/variant identifiers and/or icons (e.g., distance from a central point, where the type/variant identifiers are arranged on concentric circles having radii dependent on the relevance and/or correlation values); and/or the like and/or any combinations thereof. In one implementation, the GDMA may further associate additional information, metadata, document source information, and/or the like with one or more displayed data values. For example, for each data point corresponding to a value of the displayed default and/or selected data type and/or phrase variant, the GDMA may access and/or provide for display a collection of information (e.g., a snippet), such as global information associated with the document source from which the data point was derived (e.g., title, date of creation, date of last edit, author, document size, document rating, and/or the like), local information associated with the document source (e.g., a portion of the text from which the data point was derived and/or extracted), statistical information characterizing the data point with respect to other similar and/or related data points and/or statistical quantities derived therefrom, and/or the like.

The configured results are then displayed and/or provided for display to the user 245. A determination may be made as to whether any display reconfiguration commands have been received 250, such as may include a change in display parameters, display ranges (e.g., range of values for data types and/or phrase variants, range of values for occurrence counts, correlation values, relevance values, and/or the like), data representation format (e.g., histogram representation, timeline representation, correlated data representation, and/or the like), data type and/or phrase variant sorting (e.g., by count of occurrences, correlation value, relevance value, alphabetically, chronologically, according to dates associated with the earliest and/or latest source documents, and/or the like), and/or the like. If such a display reconfiguration command has been received, the GDMA may return to 240 to reconfigure the query results and discovered data types and/or phrase variants for display. Display reconfiguration may include any combination of server-side and/or client-side processing activities.

In another configuration, the results, and in at least one implementation the entire term tensor associated with the query term, are exportable to a relational database and/or may be employed to seed a predictive analytics package (e.g., IBM SPSS Statistics, Modeling, and/or Deployment packages; GNU R and/or Comprehensive R Archive Network packages; and/or the like). In an alternative implementation, the entire term tensors and/or some fraction thereof may be exported to one or more data visualization interfaces (e.g., the Mondrian data visualization package, GGobi, and/or the like) via corresponding APIs.

If no display reconfiguration command is received at 250, the GDMA may determine whether a new data type and/or phrase variant selection has been received. If so, then the GDMA may return to 240 to reconfigure query results based on the data type selection. For example, in one implementation, selection of a new data type may trigger the querying and/or accessing of data type values associated with the selected data type from the term tensor and/or from other GDMA data resources, and configuration of retrieved values for display based on default and/or selected display configuration parameters. In one implementation, data type selection may further cause reconfiguration and/or generation of other displayed data types and/or phrase variants, such as based on their relationship with and/or correlation to the selected data type and/or the original query terms. Thus, for example, whereas the original list of data types may include those most correlated with the original query terms, selection of a data type may cause the GDMA to determine and/or provide a list of other data types and/or phrase variants that are associated in the document corpus with both the original query terms and the first data type. If no new data type selection is received at 255, a determination may be made as to whether a new query input has been received 260. If so, then the GDMA may return to 201. Otherwise, the operation may conclude 265.

Figure 3:
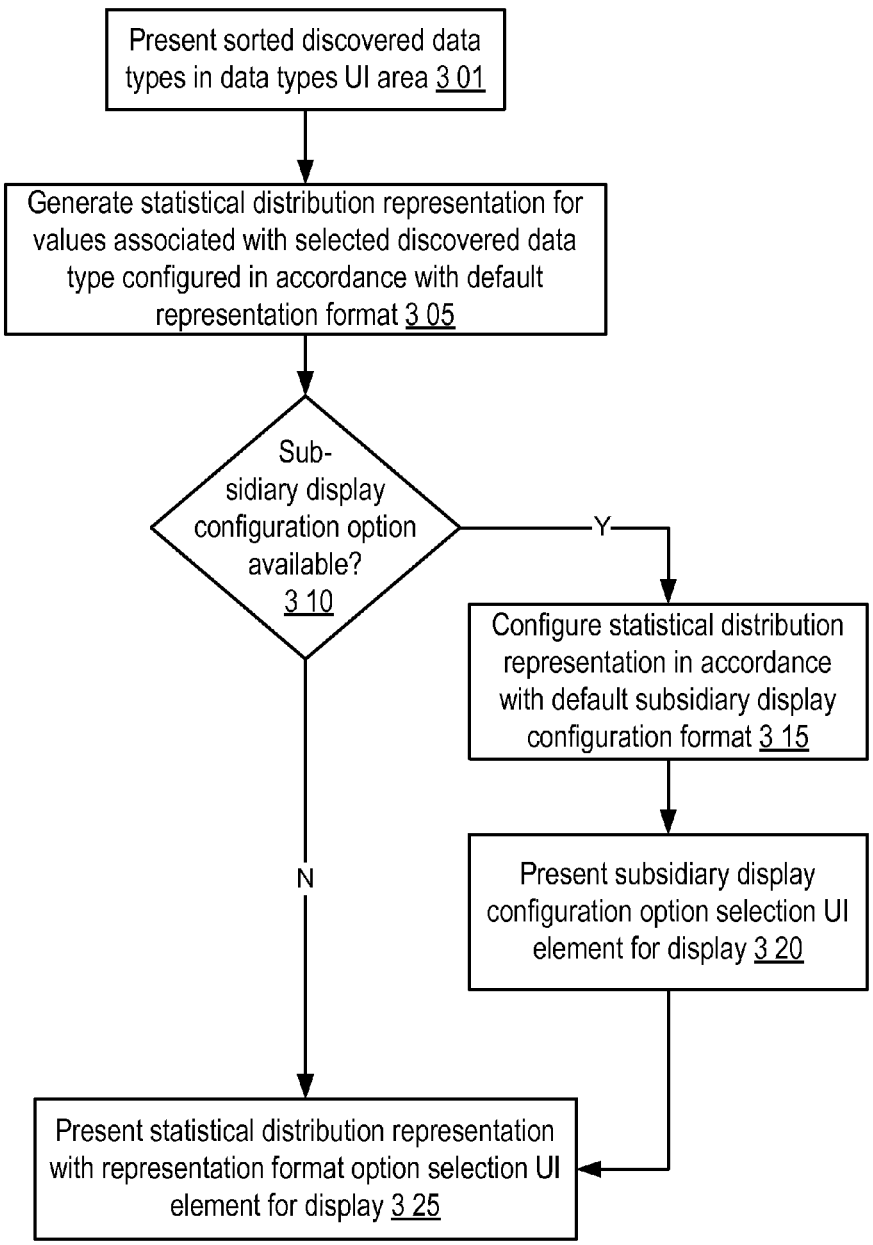
FIG. 3 shows an implementation of logic flow for user interface configuration in one embodiment of GDMA operation.

FIG. 3 shows an implementation of logic flow for user interface configuration in one embodiment of GDMA operation. The GDMA may present sorted discovered data types associated with a given query input within a data types display area within the UI 301. One or more distributions, statistical quantities, and/or the like may be generated based on values for a default and/or selected data type, and may be configured in accordance with one or more default and/or selected representation formats 305, such as, but not limited to, a histogram, timeline, XY plot, correlated display, pie chart, line graph, candlestick plot, open-high-low-close chart, and/or the like. A determination may be made as to whether there are one or more subsidiary display configuration options available 310, such as may depend, for example, on the query inputs, default and/or selected data types, default and/or selected representation format, and/or the like. Subsidiary display configuration options may include, but are not limited to, sorting data based on one or more factors (e.g., correlation, relevance, chronology, document source, statistical significance, value relative to mean, and/or the like), isolating a subset of results for display, differentiating and/or highlighting trends and/or result subsets, presenting derived and/or statistical quantities for display (e.g., mean, median, mode, running average, linear regression and/or other curve fitting, first or higher order derivative, first or higher order integral, and/or the like; the GDMA may further be configured to present any such derived and/or statistical quantities based on subsets of the total results displayed), adjusting plot appearance characteristics, varying the number of results shown and/or the size of the document corpus pertinent to the results shown, and/or the like. Thus, in one example, the GDMA may be configured to provide the option of sorting data type values by correlation value whenever a histogram representation is set. In another example, the GDMA may be configured to provide options for display of derived and/or statistical quantities whenever the query inputs include particular words, phrases, unit identifiers, numerical values and/or ranges, and/or the like.

If one or more subsidiary display configuration options are available, the GDMA may configure the statistical distribution representation in accordance with a default subsidiary display configuration format 315, and may present one or more subsidiary display configuration option selection UI elements (e.g., drop-down menu, radio buttons, switches, control knobs, dials, and/or the like) for display 320. The statistical display representation may then be provided for display to the user, and may further include one or more representation format selection UI elements 325, which may allow a user to specify a desired representation format such as histogram, timeline, correlated and/or XY plot, and/or the like.

Figure 4A:
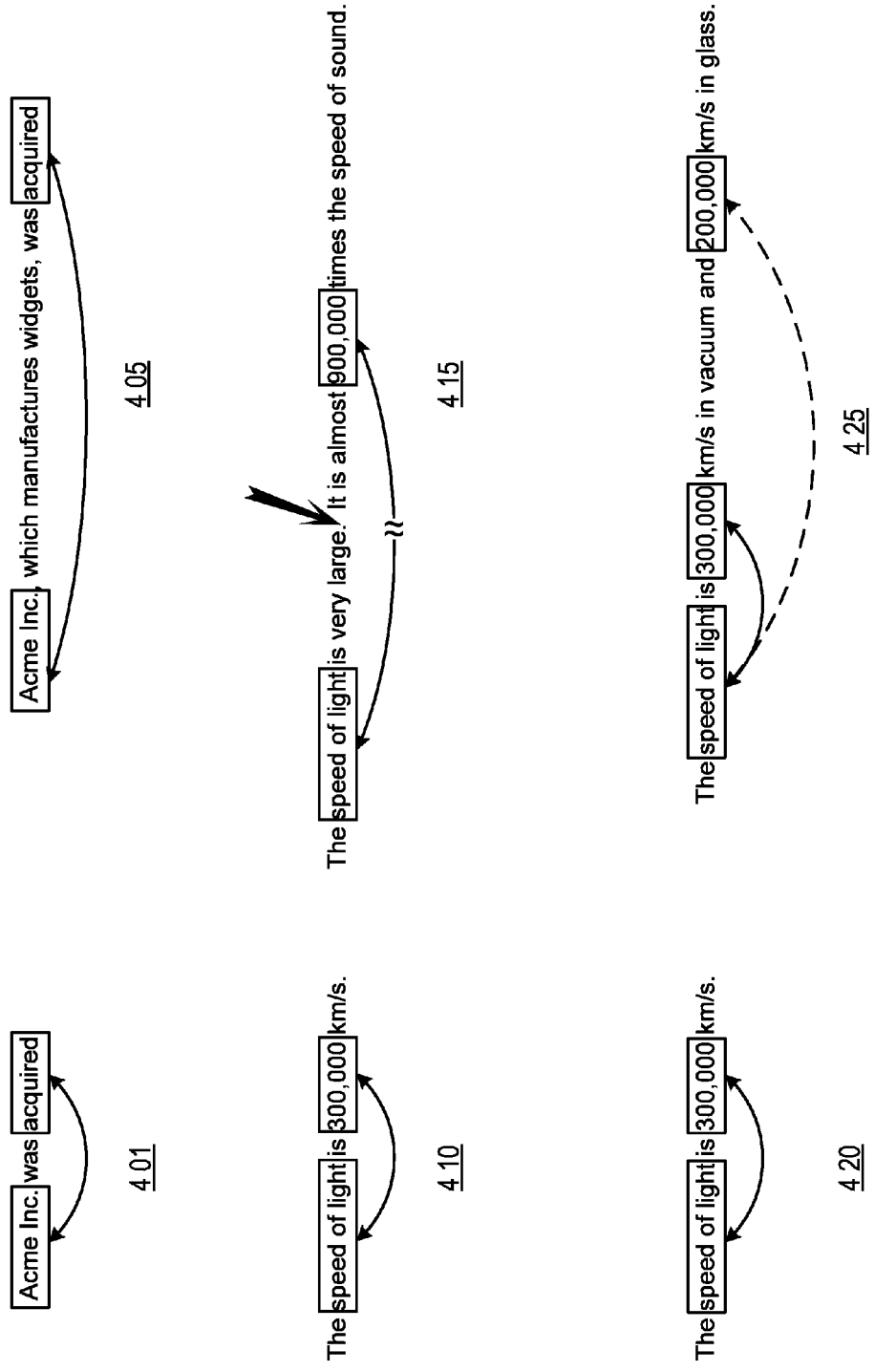
FIGS. 4A-4B show schematic illustrations of term association identification and weighting in embodiments of GDMA operation.
Figure 4B:
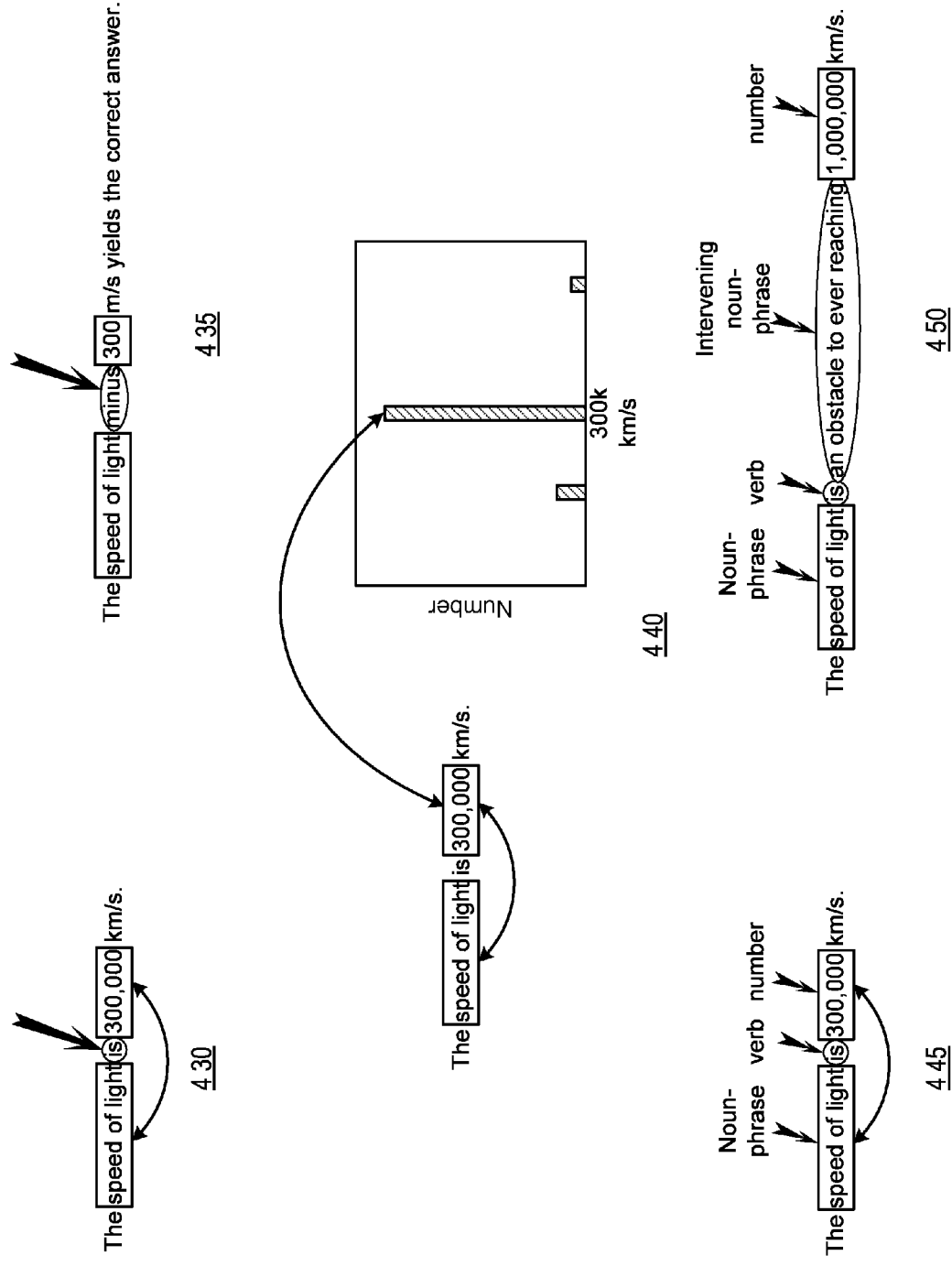

FIGS. 4A-4B show schematic illustrations of term association identification and weighting in embodiments of GDMA operation. As noted above, and in co-pending application Ser. No. 12/496,199 filed Jul. 1, 2009, entitled, "SYSTEM AND METHOD FOR UNITS-BASED NUMERIC INFORMATION RETRIEVAL," and application Ser. No. 12/754,249 filed Apr. 5, 2010, entitled, "AUTOMATED UNIT FINDING FOR NUMERIC INFORMATION," both of which are incorporated in their entirety herein by reference, the GDMA may determine correlation and/or relevance of correlations between different elements of information (e.g., between different query terms, between query terms and data types, between query terms and phrase variants, between data types and data type values, and/or the like) in the corpus of electronic documents. Data types found to be correlated with a query term in the corpus may be used to construct the vector structure of a term tensor associated with that query term, and data type values found to be correlated with those types may be used to populate the vector components, thereby establishing a term tensor data structure embodying the tiered relationship between the query term, data types, and data type values. In one implementation, data types may be determined to be associated such that they are made to contribute to the term tensor based on a correlation score surpassing a scoring threshold, which may be fixed at a constant level and/or may be determined by relative correlation scores to other data types within the corpus. Such a term tensor data structure is discussed in further detail below. FIGS. 4A-B include illustrations of a non-exhaustive list of factors, criteria, metrics, and/or the like for determining correlation and/or relevance values for document information element associations. Determination of such values may include any combination of the techniques and/or metrics illustrated in FIGS. 4A-4B, discussed in co-pending application Ser. No. 12/496,199 and/or co-pending application Ser. No. 12/754,249 filed Apr. 5, 2010, and/or the like information correlation and/or NLP techniques. In one implementation, correlation occurrences between document information elements within the electronic document corpus may be detected based on techniques and/or metrics such as those shown in FIGS. 4A-4B. In another implementation, a GDMA weighting/scoring component may initially take note of all data points of a given type that occur within a particular distance (e.g., number of characters) of the query term within the text of the documents, and may then weight each occurrence based on a weighting factor determined in accordance with techniques and/or metrics such as those shown in FIGS. 4A-4B.

The techniques and/or metrics illustrated in FIGS. 4A and 4B include:

- Evaluating the proximity between document information elements (e.g., between query terms and data types, between query terms and data values, between data types and data values, and/or the like). For example, if the phrase "Acme Inc." is separated from associated term "acquired" by a smaller number of characters and/or words in one instance 401 than in another 405, then the correlation and/or relevance score, weight, and/or the like for the former instance of correlation 401 may be higher (or lower, depending on the scoring scheme) than for the latter 405 to indicate the different degree of correlation. In one implementation, a GDMA weighting/scoring component may determine a correlation score, weight, and/or the like based on the inverse of a first, second, and/or higher power of the distance (e.g., number of characters) between document information elements. In one implementation, the power to which the distance is raised may be different depending on various factors, such as the size of the document corpus, the number of occurrences of the query term within the corpus, the content and/or categorization of the query term, and/or the like.
- Identifying punctuation and/or other delimiters separating document information elements. For example, if the phrase "speed of light" is not separated from associated data by delimiting characters (e.g., a period, semi-colon, colon, comma, and/or the like) in one instance 410, but is separated from that data by one or more such characters in another instance 415, then the correlation and/or relevance score, weight, and/or the like for the former instance of correlation 410 may be higher (or lower, depending on the scoring scheme) than for the latter 415 to indicate the different degree of correlation. In one implementation, a GDMA weighting/scoring component may determine a correlation score, weight, and/or the like based on the first, second, and/or higher-order inverse power of the number of delimiting characters separating the document information elements (a+1 may be added to the number of such characters in order to avoid undefined results when no delimiting characters are present).
- Identifying other data separating document information elements. For example, if the phrase "speed of light" is discovered to be proximate to only one element of associated data in one instance 420, but to more than one element of associated data in another 425, then the correlation and/or relevance score, weight, and/or the like for the former instance of correlation 420 may be higher (or lower, depending on the scoring scheme) than that for one or both of the elements in the latter instance 425. In particular, where there are more than one data elements discovered proximate to a particular term, as in 425, a correlation value may be determined for each element, and the more distant element separated from the term by the closer element may be assigned a reduced correlation score by virtue of that separation. In one implementation, a GDMA weighting/scoring component may determine a correlation score, weight, and/or the like based on the first, second, and/or higher order inverse power of the number of intervening document information elements separating two other document information elements.
- Identification of prepositional phrases, and/or evaluation of other NLP factors. For example, if the phrase "speed of light" is separated from associated data by the word "is" in one instance 430, but by the word "minus" in another 435, then the correlation and/or relevance score, weight, and/or the like for the former instance of correlation 430 may be higher (or lower, depending on the scoring scheme) than the latter 435. In one implementation, a GDMA weighting/scoring component may compare intervening words and/or phrases separating document information elements to elements of a lookup table of NLP words and/or phrases to characterize those intervening words and/or phrases, and/or to assist in quantifying the degree of correlation between the document information elements.
- Comparison of data values with distributions of other data values previously associated with the query term. For example, if the phrase "speed of light" occurs proximate to a particular data value in a document, the GDMA may compare that value with a distribution and/or statistical quantities derived from data values previously associated with the term "speed of light" to inform determination of a correlation and/or relevance score, weight, and/or the like. In one implementation, a GDMA weighting/scoring component may increment a correlation and/or relevance score, weight, and/or the like for a given correlated occurrence of a term and data type value if the value being evaluated is determined to be equal to and/or within a threshold distance of a mean, median, mode, and/or the like statistical quantity associated with data type values previously associated with the term.
- Tagging and/or recognizing parts of speech, noun phrases, and/or the like separating document information elements. For example, the phrase "speed of light" and the data type-value "300,000 km/s" may be identified as nouns, and if they are separated only by the word "is" which is identified as a verb in one instance 445, but by several words which are identified as a verb and an intervening noun phrase in another instance 450, the former instance of correlation 445 may be higher (or lower, depending on the scoring scheme) than the latter 450.

Figure 5A:
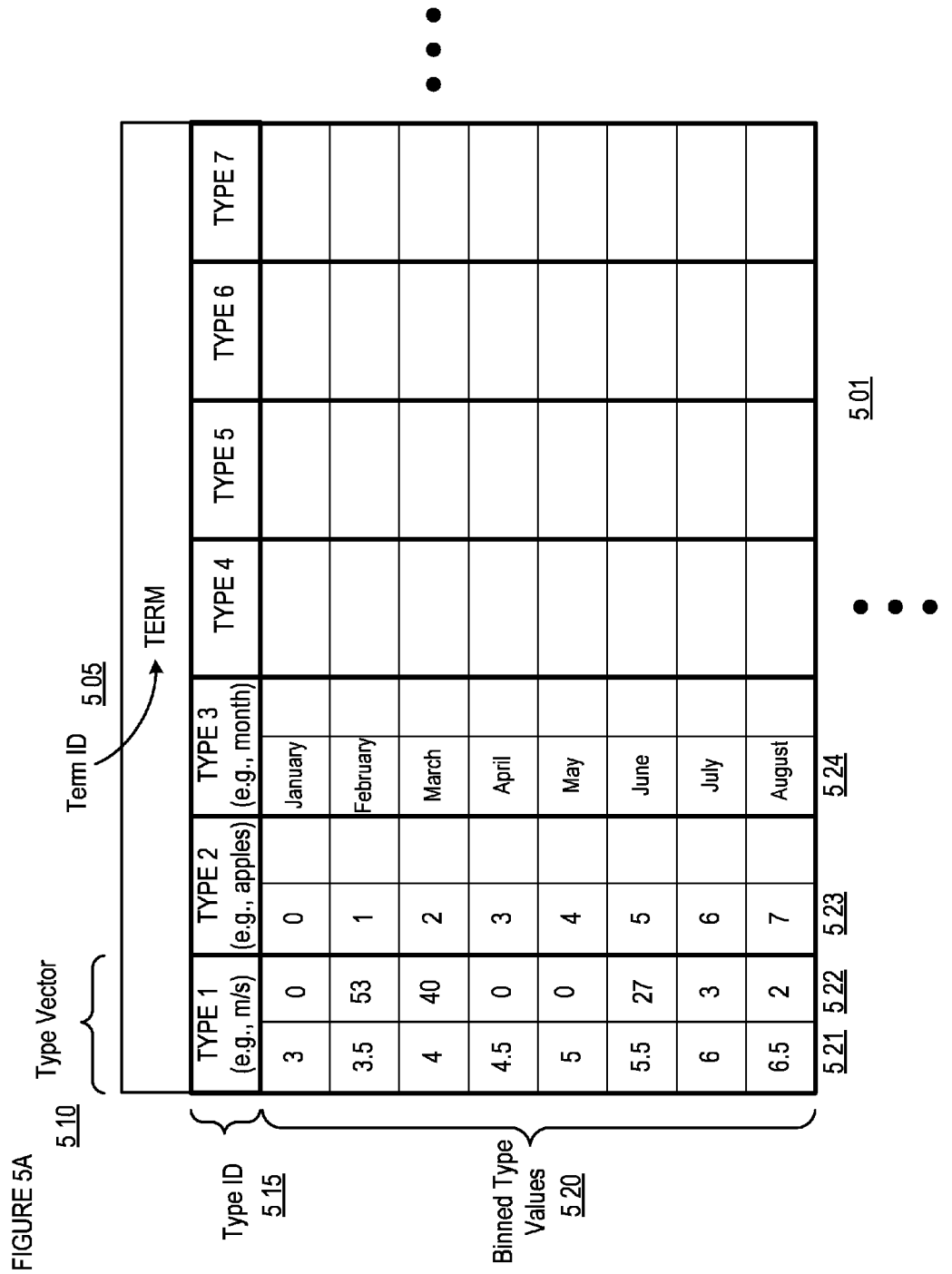

FIGS. 5A-5D show schematic illustrations of term tensors and term tensor similarity determinations in embodiments of GDMA operation. A term tensor 501 may embody information about relationships between query terms, data types and data type values determined by analyzing the contents of the corpus of electronic documents. In one implementation, a unique term tensor may be formed for each term in the corpus of electronic documents, such that the term tensor may be identified by a corresponding term identifier ("ID") 505. It should be noted that, although the data structure illustrated in FIG. 5A is shown to include field values, such as term ID 505, the GDMA may configure the data structure such that any or all such values are embodied as links, pointers, foreign keys, and/or the like. The term tensor may further include one or more type vectors 510 associated with the term ID, wherein each type vector is identified by a type ID 515 (e.g., a unit such as seconds, grams per mole, meters per second, grams per meter^3, and/or the like; phrase variants; other query terms; brands, product lines, locations, organizations; and/or the like). In one implementation, data type identifiers may be any of a pre-defined collection of data type identifiers, such as may be updated by a GDMA administrator. In another implementation, data types may be identified on the fly during processing and analysis of the corpus of electronic documents, such as, for example, based on proximity to numerical values in the corpus and/or any other relationship identification techniques, such as those shown in FIGS. 4A-4B. In addition to the type ID 515, each type vector 510 may include a set of values 520, which may be thought of as a spectral signature for the term as parameterized by the data type. Data type values may be numerical and/or non-numerical depending on the associated data type so, for example, a data type of "meters/second" may have numerical values, while a data type of "gene" may have alphanumeric strings indicative of a particular gene sequence. In one implementation, the GDMA may configure type vectors 510 to have binned values 520, wherein the vector components each comprise a binned value and a value representing the frequency of occurrence of that binned value or values sufficiently close to it to be assigned thereto. For example, in FIG. 5A, the column at 521 may include binned values for the data type "m/s," while the column 522 may reflect the number of documents and/or occurrences within documents in which the corresponding binned value has occurred. How binning is formatted, structured, and/or effectuated by the GDMA may vary depending on a variety of factors, such as the data type, query term, distribution of discovered values in the document corpus, memory and/or processing requirements and/or capabilities, and/or the like. For example, binning for type vectors containing geolocation data may employ longitude and latitude specifications, while binning for type vectors containing organizations may employ bin variant spelling and/or abbreviations of an organization. The schematic term tensor shown in FIG. 5A includes data types with binned values for continuous numerical quantities 521 (though the "m/s" admits a continuum of values, the term tensor has configured the binning in discrete steps of 0.5 m/s), discrete numerical quantities 523, non-numerical quantities 524, and/or the like. In one implementation, the GDMA may configure binning for a given data type uniformly across term tensors. In another implementation, the GDMA may configure binning for a given data type according to the range of data type values detected in the document corpus for a particular term (e.g., uniformly spaced from minimum value to maximum value within the corpus data). In another implementation, the GDMA may dynamically configure binning for a given data type according to the distribution of detected values, such as to achieve an optimal and/or desired data resolution level based on the relative sparseness of the data itself. In another implementation, the GDMA may configure binning for a given data type according to a list or table of values (e.g., names of months, as at 524 in FIG. 5A), data feed, and/or the like. In one implementation, different type vectors in different term tensors and/or within a single term tensor may have different binning resolutions, bin numbers, binning units, binning rules/constraints, and/or the like. In one implementation, binned data may be associated with a variety of other information, such as document source, snippet ID, correlation and/or relevance value, statistical significance, and/or the like metadata. Further aspects of implementations of GDMA data binning are discussed in co-pending application Ser. No. 12/496,199 and co-pending application Ser. No. 12/754,249 filed Apr. 5, 2010, which are incorporated in their entirety herein by reference.

The GDMA may perform a variety of operations utilizing term tensors. In one implementation, the GDMA may allow for comparison of two or more term tensors along one or more data type constraints. FIG. 5B shows a first term tensor 525 having a type vector corresponding to data type A, and a second term tensor 530 also having a type vector corresponding to data type A. The GDMA may evaluate an inner product 535, convolution, cross-spectral density, pair-wise comparison, and/or the like between the corresponding data type vectors for each term tensor 525, 530, such as to obtain a measure of the similarity 540 between the term tensors as reflected in the data type values. Thus, in one example, two companies may be compared according to a "profits" data type in order to determine the similarities between associations of those company names in the document corpus with profit values. In another example, two individuals can be compared according to a "meters" data type to evaluate, perhaps, the similarities in their heights, or in other characteristic length values associated with those individuals. In one implementation, the GDMA may re-bin, normalize, crop, perform unit conversion on, and/or the like one or both type vectors prior to similarity determination in order to facilitate the evaluation of the inner product.

The GDMA may also be configured to admit comparisons of two or more term tensors along more than one data type constraint. In FIG. 5C, both a first term tensor 545 and a second term tensor 550 include type vectors corresponding to data types A and B. The GDMA may determine an inner product 555 for each of the data types, as discussed above with reference to FIG. 5B, and may store, publish, provide, and/or the like a list of type-specific inner products 560. In one implementation, the GDMA may further combine type-specific inner product values via one or more combination operations 565 to yield an overall overlap or similarity between the terms corresponding to the term tensors. For example, in one implementation, the GDMA may sum type-specific inner products across all selected types to determine an overall similarity.

Figure 5D:
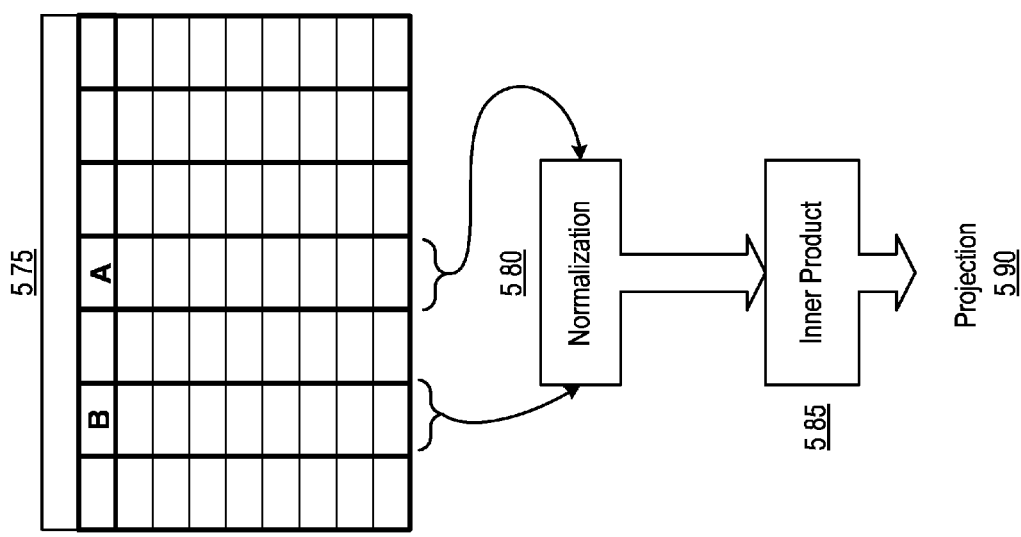

The GDMA may also be configured to compare different data type vectors from a single term tensor and/or across two or more term tensors. In FIG. 5D, a single term tensor is shown 575 having type vectors corresponding to data types A and B. The GDMA may first execute one or more normalization operations 580 on the type vectors, in order to render them suitable for comparison, inner product determination, and/or the like. For example, the GDMA may convert units, scale, extrapolate, interpolate, re-bin, multiply by one or more coefficients, convert type values to new type values based on a conversion table lookup, and/or the like. Normalized type vectors may then be subjected to one or more inner product operations 585 in order to determine a projection 590 of one data type vector on to the other. Thus, in one example, a "meters" type in a term tensor drawn from demographic data (e.g., such as may correspond to heights) may be compared to a "U.S. dollars" type vector (e.g., such as may correspond to wages/salaries) in the same or another term tensor by, for example, first converting the meters values to dollars by reference to a lookup table correlating heights to salaries drawn from external data sources and/or from the GDMA-analyzed document corpus itself.

Figure 6A:
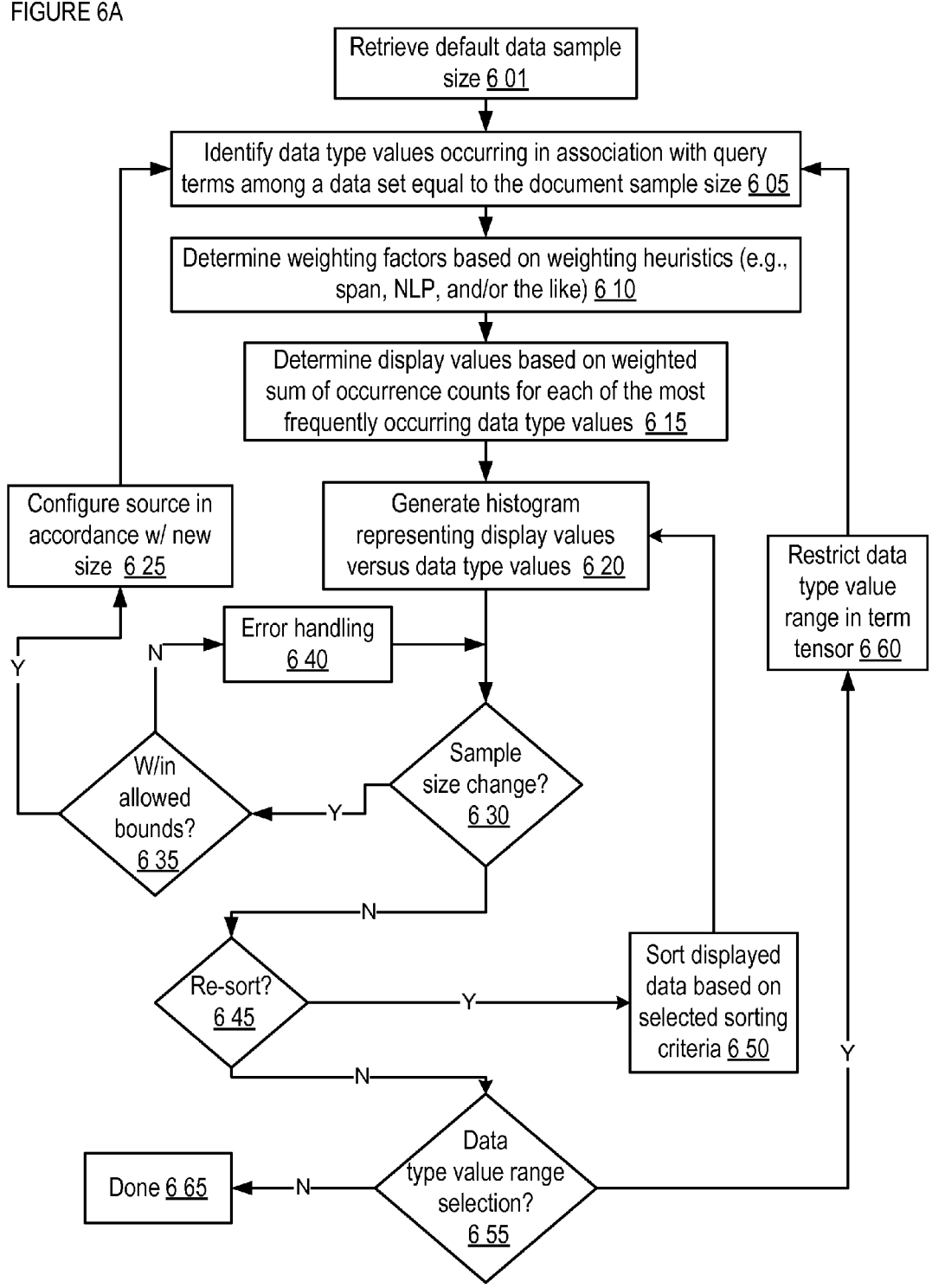
FIG. 6A shows an implementation of logic flow for histogram data representation in one embodiment of GDMA operation.

The GDMA may admit a wide variety of data representation formats in order to reflect and/or highlight various aspects of trends, relationships, dynamics, outliers, and/or the like of document corpus data. FIG. 6A shows an implementation of logic flow for histogram data representation in one embodiment of GDMA operation. The GDMA may be configurable to restrict and/or regulate the size and/or scope of the document corpus, term tensors, inverted index query, and/or the like depending on system settings, default values, user selections, and/or the like. In one implementation, the GDMA may access a default document sample size 601 and identify one or more data type values occurring in association with query terms within that collection of documents 605. In one implementation, an association between a query term and a particular data type and/or type value may be registered whenever the query term is detected within a specified distance (e.g., number of characters) from the data type and/or type values in any document in the corpus. The GDMA may also determine weighting factors 610 for each association detected at 605, such as may be based on one or more weighting heuristics such as those illustrated in FIGS. 4A-4B. Display values may then be determined 615 as a sum of the number of associations identified at 605, where each association is weighted by the corresponding weighting factor determined at 610. The GDMA may then generate a histogram, presenting for each data type value, and/or range thereof, corresponding display values 620. An example of such a histogram representation is provided in FIG. 6B. In one implementation, the GDMA may package data type values and corresponding display values for a given query term as a term tensor similar to that shown in the examples of FIGS. 5A-5D.

A determination may be made as to whether a sample size change (e.g., a change in the number of analyzed documents in the corpus) has been entered or requested 630. If so, a determination may be made as to whether the new corpus size is within an allowed range 635, such as may be based on the number of available documents, the number of available documents containing a particular query term, detected client and/or server storage and/or processing capabilities, fixed size limits, and/or the like. If not within allowed bounds, the GDMA may undertake one or more error handling procedures 640, such as providing an error message to the requesting user, requesting reentry of the size request, setting a default and/or limiting sample size, and/or the like. If within the allowed bounds, the GDMA may access a number of documents and/or data derived therefrom in accordance with the size request 625.

The GDMA may also determine whether a request has been received to re-sort displayed data type values 645, such as based on the receipt of a sorting criterion identifier. If such a request is detected, the GDMA may sort the displayed data type values in accordance with the received sorting criteria 650 before updating or generating a new histogram with the newly sorted data type values.

The GDMA may also determine whether a data type value range selection has been received 655. A user may, for example, select a new data type value range by entering range limits, clicking and dragging a mouse on the histogram representation itself to select the desired range, and/or the like. If a new data type value range is selected, the GDMA may restrict the accessed data type values in accordance with the received selection 660. Otherwise, the histogram data representation generation and display flow may conclude 665.

Figure 6B:
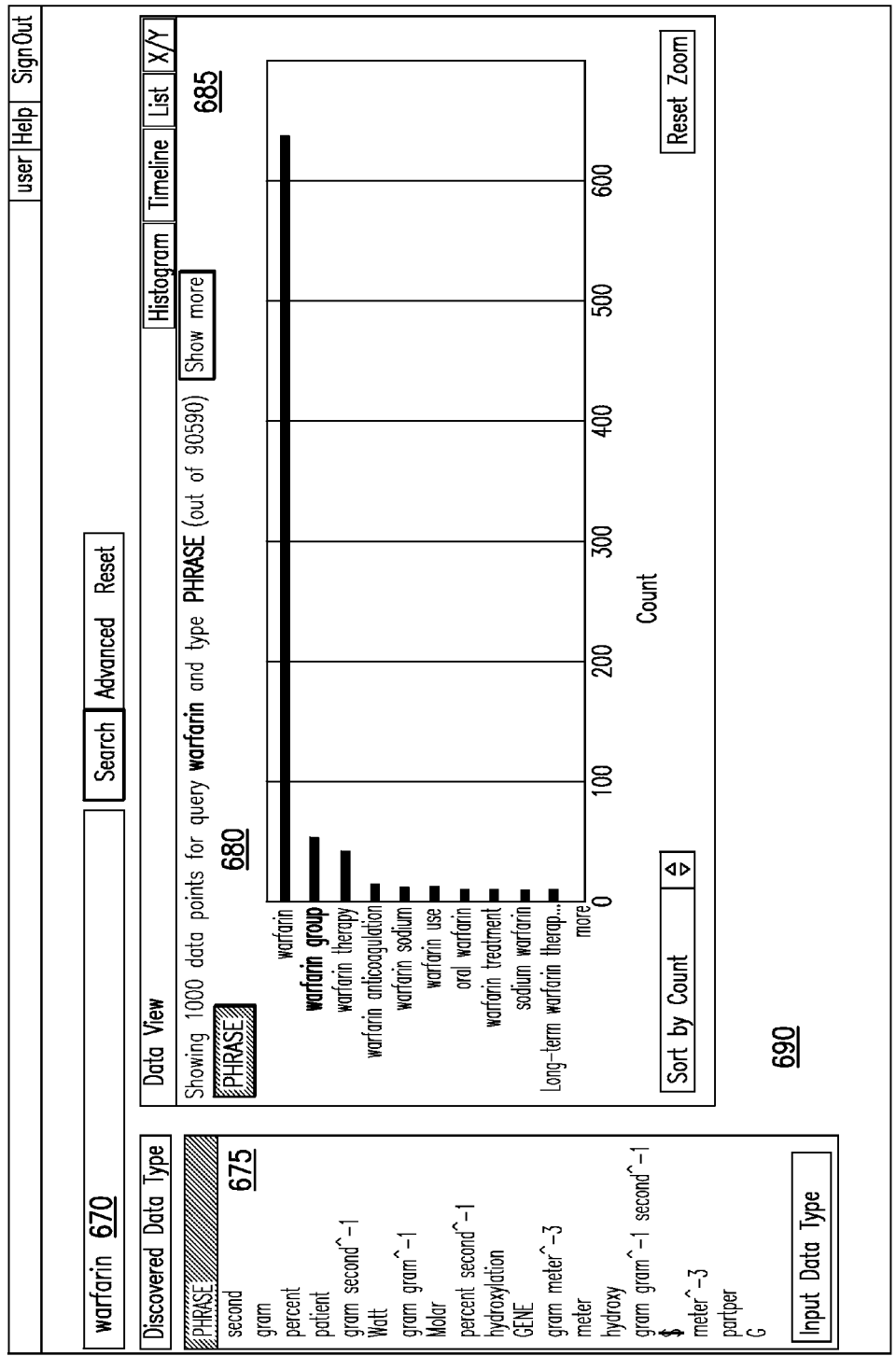
FIG. 6B shows an implementation of user interface for histogram data representation in one embodiment of GDMA operation.

FIG. 6B shows an implementation of user interface for histogram data representation in one embodiment of GDMA operation. The interface may include a field admitting query inputs, query input strings, Boolean expressions, and/or the like 670. The interface may further include a discovered data types area 675, providing a listing of data types determined by the GDMA to be associated with the query inputs entered at 670. In one implementation, discovered data types may be sorted based on the degree of relevance, association, correlation, and/or the like to the query inputs. The interface may further include a histogram display area 680, where a histogram data representation may be provided for graphical display. The interface may further include one or more interface elements for selection of alternative data representation formats 685, such as histogram, timeline, list, XY, and/or the like. The interface may further include interface elements for selection off sorting criteria 690, whereby a user may select criteria for sorting displayed data type values in the histogram data representation at 680.

In another embodiment, the interface may list the different vector types associated with the corresponding term tensor. Such a list may be presented, in one implementation, as a histogram where the number of hits for each vector type is plotted, and/or may be presented as a list. The list, and order of rows in the histogram view, may be organized, in one implementation, based on relevancy to the query term, where relevancy may be determined according to the number of elements found in each vector type and/or by a weighted score of the number of elements, where the score may be based on contextual factors such as those discussed above, and/or where the relevancy may be determined, for example, by the recentness of data in each vector type.

FIG. 7 shows an implementation of logic flow for correlated data representation in one embodiment of GDMA operation. Correlated or XY data representation may allow a user to view relationships between pluralities of data type values associated with a given query term. The GDMA may identify discovered second data types associated with a selected first data type and, in one implementation, also with the query input 701. In one implementation, a second data type may be found by the GDMA to be associated with a first data type if both occur in the same document. In another implementation, a second data type may be found by the GDMA to be associated with a second data type if both occur within a specified distance of each other within a document and/or are further related to each other by weighting heuristics such as those illustrated in FIGS. 4A-4B. A list of discovered second data types may be provided for selectable display 705. In one implementation, the list of discovered second data types may be sorted prior to display, such as based on a count of associations, relevance, correlation, and/or the like to the selected first data type. A second data type selection may be received 710, and the GDMA may query an inverted index associated with the document corpus to retrieve correlated occurrences of first and second data type values 715. In another implementation, the GDMA may retrieve such occurrences from a term tensor and/or one or more records linked thereto. The GDMA may then provide pairs of correlated first and second data type values for display as points in a correlated data representation 725. A determination may be made as to whether a new second data type selection is desired 730 and, if so, the GDMA may return to 710 to receive the second data type. If not, the GDMA may determine whether a new first data type selection has been received 735. If so, then a new first data type selection may be received 740, and the GDMA may return to 701 to identify a new list of associated second data types. Otherwise, the correlated data representation generation and display flow may conclude 745.

Figure 8:
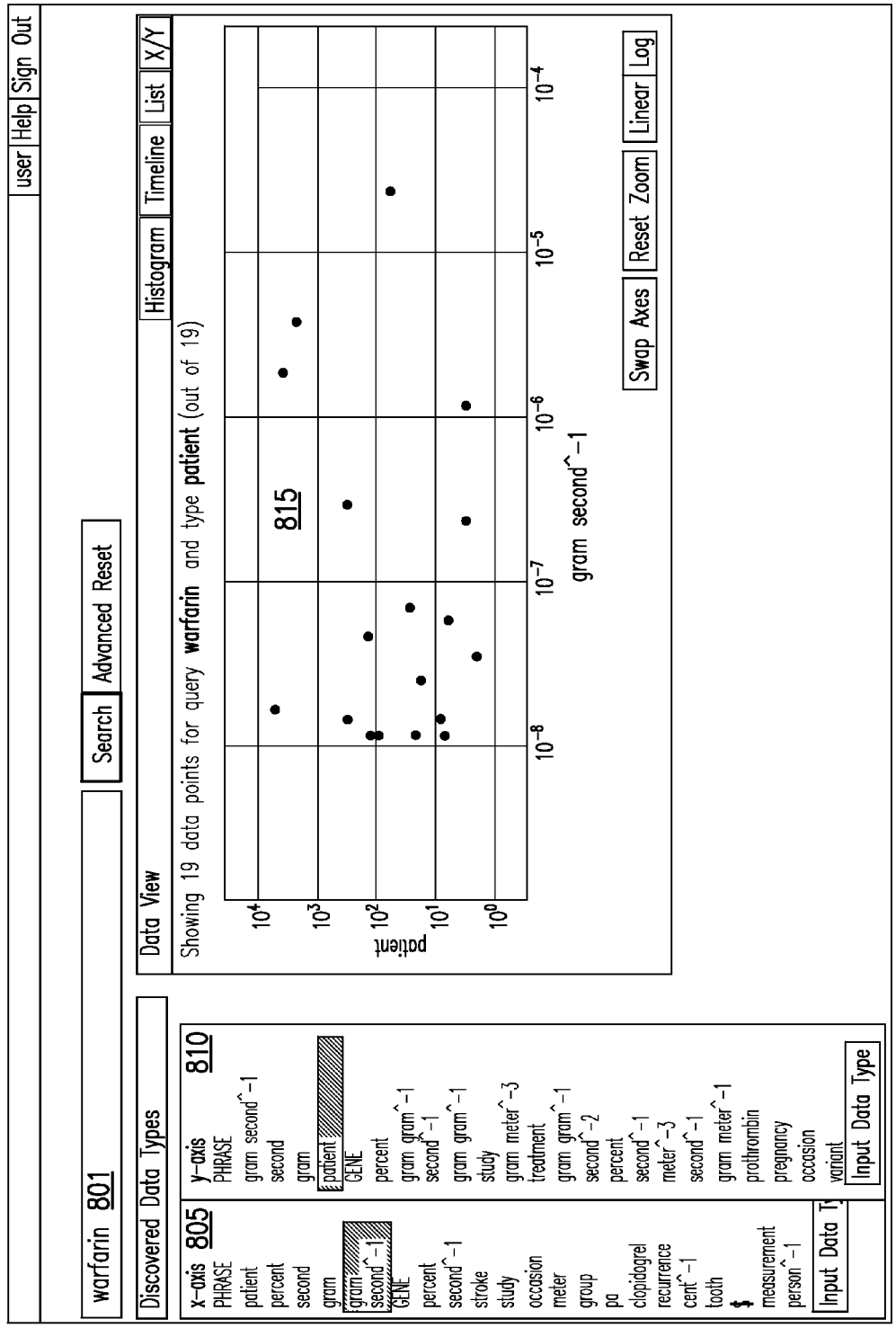
FIG. 8 shows an implementation of user interface for correlated data representation in one embodiment of GDMA operation.

FIG. 8 shows an implementation of user interface for correlated data representation in one embodiment of GDMA operation. The interface may include a field admitting query inputs, query input strings, Boolean expressions, and/or the like 801. In another embodiment, the correlated data types may be determined automatically from the corpus, such as for the terms that are automatically determined to be interesting for further analysis, without a direct user query. The interface may further include a discovered data types area, including both first discovered data types and second discovered data types 810. The interface may further include a correlated data representation display area 815, where an XY data representation may be provided for graphical display. Such a display may comprise axes corresponding to and labeled respectively with the first and second discovered data types, and points representing correlated occurrences of first and second data type values. In one implementation, the interface may also be configured to recognize functional fits to the correlated data and/or to allow the user to perform curve fitting and/or other mathematical manipulations of the data.

Figure 9:
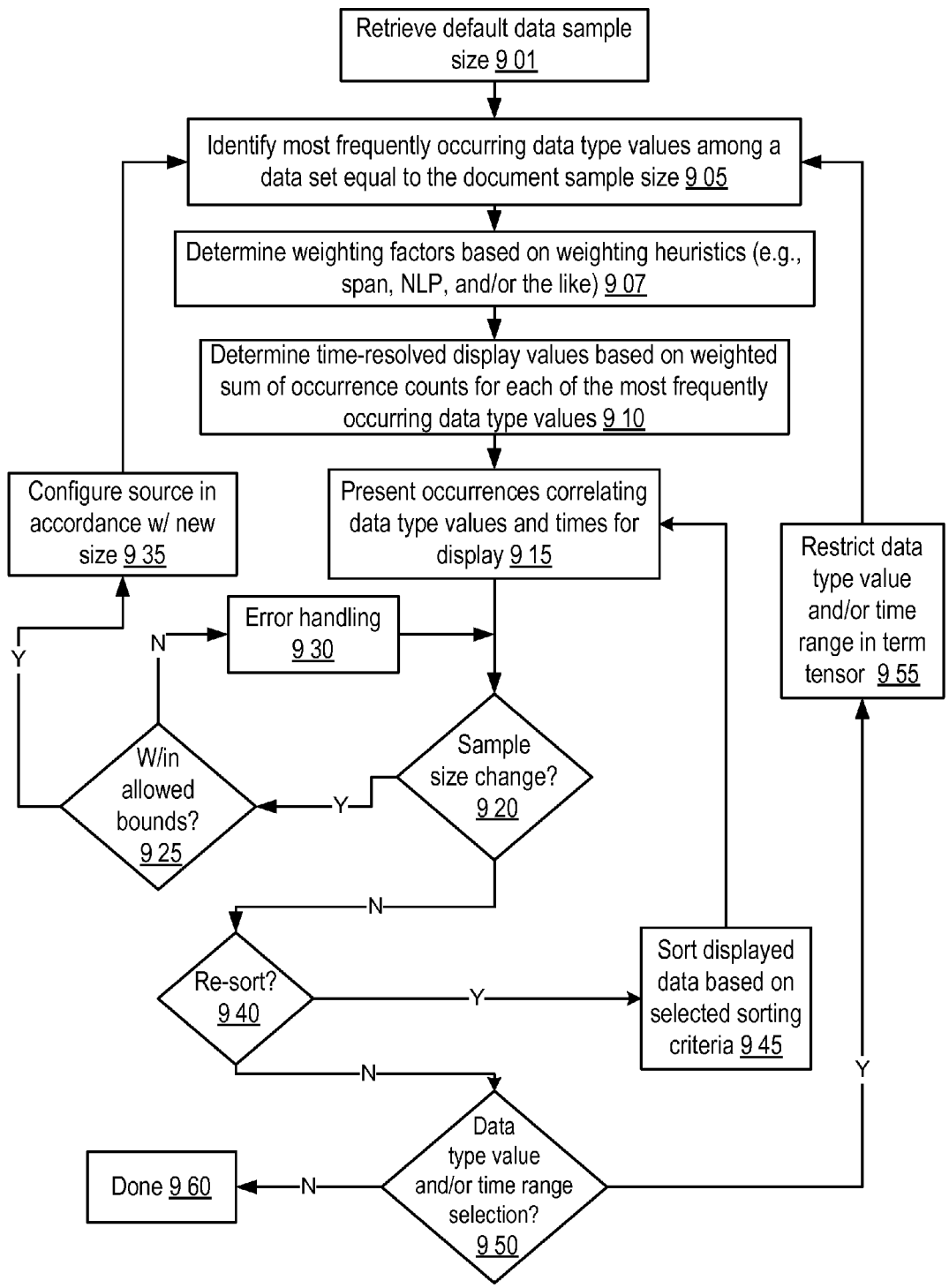
FIG. 9 shows an implementation of logic flow for timeline data representation in one embodiment of GDMA operation.

FIG. 9 shows an implementation of logic flow for timeline data representation in one embodiment of GDMA operation. A timeline data representation may, for example, provide a user with a time-resolved display of data type values associated with a given query input. In one implementation, the GDMA may access a default document sample size 901 and identify one or more data type values occurring in association with query terms within that collection of documents 905. The GDMA may also determine weighting factors 907 for each association detected at 905, such as may be based on one or more weighting heuristics such as those illustrated in FIGS. 4A-4B. Time-resolved display values may then be determined 910 as a sum of the number of associations identified at 905, where each association is weighted by the corresponding weighting factor determined at 907. Time-resolution may, in one implementation, be based on a date associated with the document in which each corresponding data type value occurs. This could be a date of creation or other date encoded in document metadata, a date presented on a cover sheet or title page, a date present in a document header or footer, and/or the like. In another implementation, time-resolution may be based on a date correlated in the document with the corresponding data type value (e.g., within a specified number of characters thereof, and/or otherwise correlated). The GDMA may then generate a graphical representation of data type values and/or ranges thereof at various times, with each point representing a correlation between that type value and that time 915.

A determination may be made as to whether a sample size change (e.g., a change in the number of analyzed documents in the corpus) has been entered or requested 920. If so, a determination may be made as to whether the new corpus size is within an allowed range 925, such as may be based on the number of available documents, the number of available documents containing a particular query term, detected client and/or server storage and/or processing capabilities, fixed size limits, and/or the like. If not within allowed bounds, the GDMA may undertake one or more error handling procedures 930, such as providing an error message to the requesting user, requesting reentry of the size request, setting a default and/or limiting sample size, and/or the like. If within the allowed bounds, the GDMA may access a number of documents and/or data derived therefrom in accordance with the size request 935.

The GDMA may also determine whether a request has been received to re-sort displayed data type values 940, such as based on the receipt of a sorting criterion identifier. If such a request is detected, the GDMA may sort the displayed data type values in accordance with the received sorting criteria 945 before updating or generating a new timeline with the newly sorted data type values.

The GDMA may also determine whether a data type value and/or time range selection has been received 950. A user may, for example, select a new data type value range by entering range limits, clicking and dragging a mouse on the timeline representation itself to select the desired range, and/or the like. If a new data type value range is selected, the GDMA may restrict the accessed data type values in accordance with the received selection 955. Otherwise, the timeline data representation generation and display flow may conclude 960.

In another embodiment, the GDMA may automatically determine which vector types demonstrate time series data that matches a particular pattern. Such a pattern may represent a sudden shift in value, frequency, slope, and/or the any other functional behavior. The GDMA may evaluate all term tensors in the corpus and automatically present a subset of time series vector types that demonstrate a desired pattern behavior (e.g., that exhibit a sudden shift in value).

Figure 10:
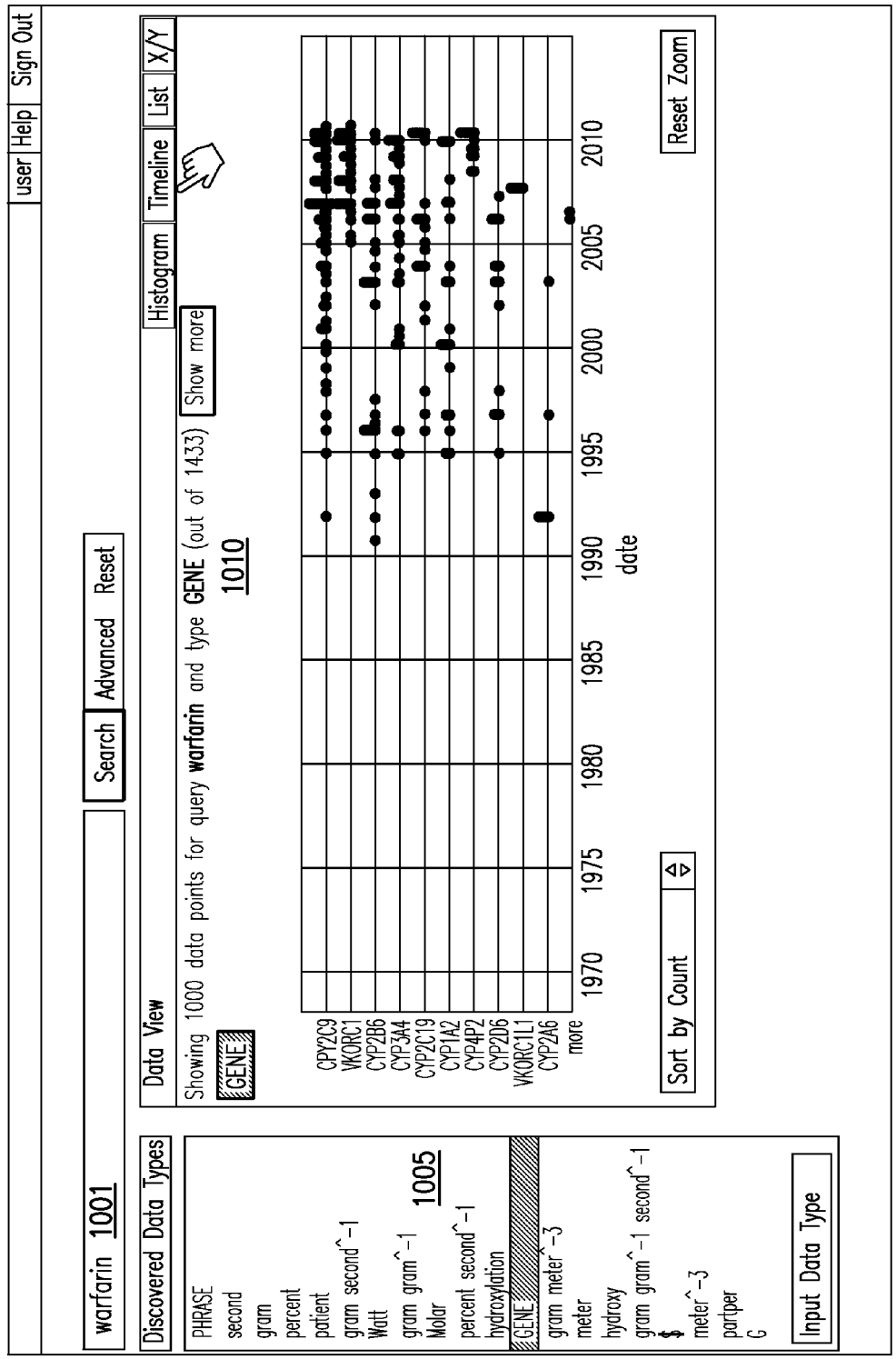
FIG. 10 shows an implementation of user interface for timeline data representation in one embodiment of GDMA operation.

FIG. 10 shows an implementation of user interface for timeline data representation in one embodiment of GDMA operation. The interface may include a field admitting query inputs, query input strings, Boolean expressions, and/or the like 1001. The interface may further include a discovered data types area 1005, listing data types discovered by the GDMA to be associated with the query inputs in the document corpus. The interface may further include a timeline data representation display area 1010, where a timeline data representation may be provided for graphical display. Such a display may comprise axes corresponding to and labeled respectively with discovered data types and time, and points representing correlated occurrences of data type values and time identifiers associated therewith within the document corpus.

Figure 11:
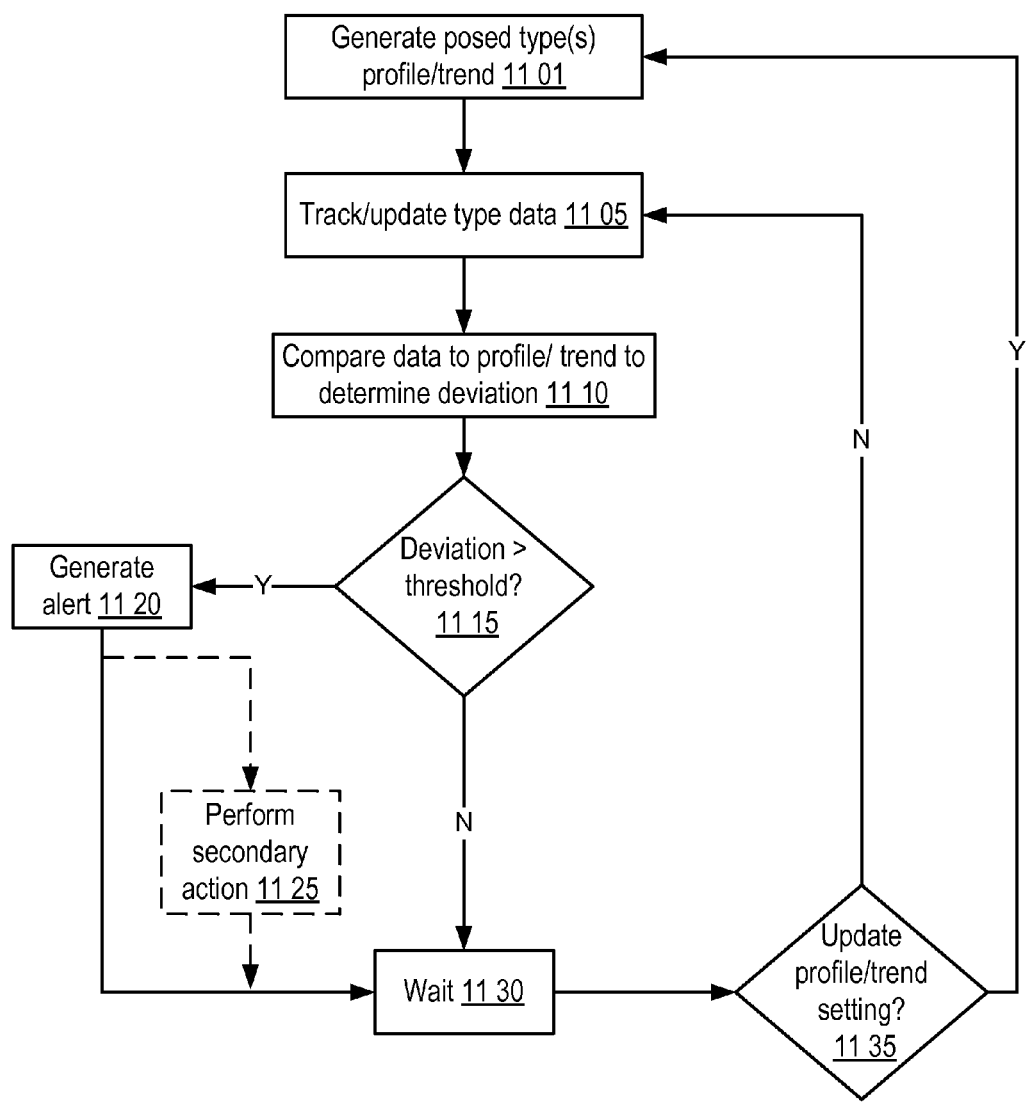
FIG. 11 shows an implementation of logic flow for alerts administration in one embodiment of GDMA operation.

FIG. 11 shows an implementation of logic flow for alerts administration in one embodiment of GDMA operation. The GDMA may be configured to track values for one or more data types associated with one or more query terms in order to determine whether and when an alertable event has occurred, and to provide appropriate alerts and/or take further actions based on that occurrence. This determination may, in one implementation, be performed at the term tensor level, where if a sufficient number of term vectors within a term tensor change by a prescribed amount, an alert may be triggered. In another implementation, the determination may be evaluated individually at the term vector level. For selected query terms and/or associated data types, the GDMA may generate a posed type profile and/or trend 1101, comprising a definition of conditions for which no alert is to be provided and/or conditions for which one or more alerts are to be provided. In one implementation, a user may specify a posed type profile by entering one or more alert conditions, such as data type values, value ranges, value trends, value patterns and/or functional forms, and/or the like. In another implementation, a posed type profile may comprise a data type value, value range, trend, functional form, statistical quantity, and/or the like derived from current or historical data type values derived from the document corpus. The GDMA may track and/or update data type values 1105, such as on a periodic, triggered, or irregular basis. For example, in one implementation, the GDMA may update the data type values at 1105 whenever a threshold number of documents are added, removed, updated, and/or otherwise changed in the document corpus. The GDMA may then compare tracked and/or updated data type values to the posed type profile 1110 to determine whether a deviation has occurred and/or whether an alert condition has otherwise been satisfied by those values 1115. If so, the GDMA may generate one or more alerts 1120. Alerts may take any of a wide variety of different forms, such as, but not limited to: an alarm; an instant message, email, short-message service (SMS) message, multimedia messaging service (MMS) message, website update, and/or the like; calendar reminder; dashboard indicator; and/or the like. In one implementation, the GDMA may further undertake one or more secondary actions 1125, such as may depend on the nature of the query term and/or data type values being tracked, on user inputs, on the data type values themselves, on user specified posed type profiles and/or alert conditions, and/or the like. For example, where a tracked data type relates to dollar values, a secondary action associated with an alert may comprise the placement of a buy or sell order for a financial security. In another example, where a tracked data type relates to a dosage unit (e.g., for a drug), a secondary action associated with an alert may comprise the adjustment of a currently administered dosage level. In yet another example, where a tracked data type relates to consumption estimates for a particular product line, a secondary action associated with the alert may comprise the adjustment of a marketing budget allocation. If the deviation is not greater than a threshold level at 1115, if alert conditions are not otherwise satisfied, or if the alert has been generated and/or provided at 1120, the GDMA may wait for a period of time 1130 before subsequent tracking of data type values. A determination may also be made as to whether there are to be any updates of posed type profile settings 1135. If so, the GDMA may return to 1101 to generate the posed data type and, if not, then to 1105 to continue tracking and/or updating the selected one or more data type values.

In one implementation, the GDMA may admit specification of more than one condition for a given alert. For example, the GDMA may track values for two or more data types and only generate an alert when both first and second data type values satisfy respective first and second conditions. In one implementation, the GDMA may allow a user to configure multiple alerts, with different alerts having different data type value conditions, different alert forms or modalities, and/or the like. In one implementation, the GDMA may admit nested conditions for alerts, whereby satisfaction of a first condition modifies a second condition for a given alert.

In one implementation, the GDMA may automatically evaluate all term tensors in the corpus, or only those term tensors associated with terms pre-selected by the user, to determine behavior that warrants an alert being sent out, without the user ever explicitly performing a query.

Figure 12:
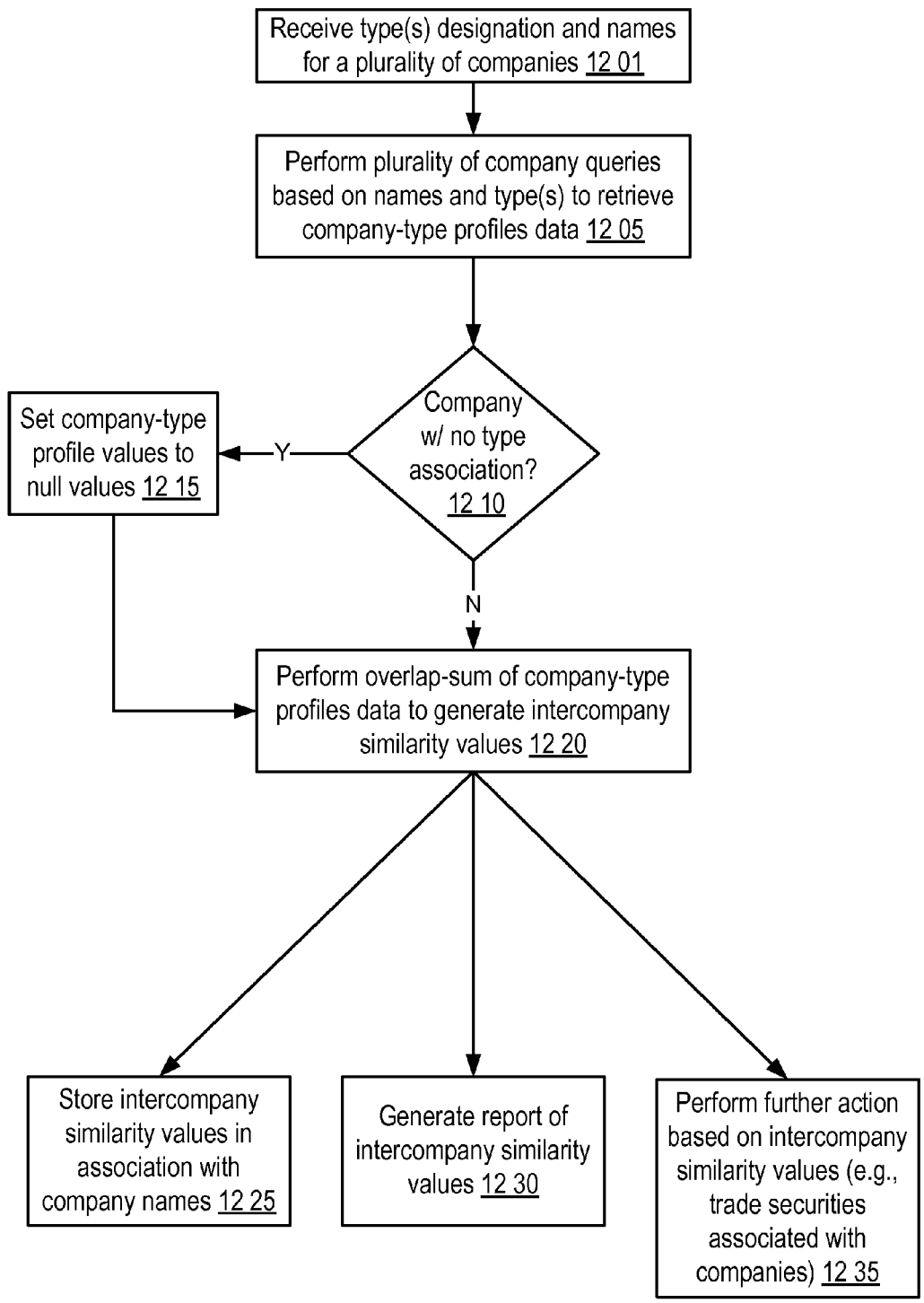
FIG. 12 shows an implementation of logic flow for similarity determination in one embodiment of GDMA operation.

FIG. 12 shows an implementation of logic flow for similarity determination in one embodiment of GDMA operation. The GDMA may be configured to receive two or more query terms, respectively identifying two or more entities, and to perform a comparison of those entities, such as based on one or more comparison criteria, variables, and/or the like. Although the example in FIG. 12 is directed to a comparison of companies, it is to be understood that this is for illustrative purposes only, and the GDMA can also be configured to compare a wide variety of other entities. The GDMA may receive one or more data type designations, as well as names and/or other identifiers for a plurality of companies 1201. For each of the plurality of companies, the GDMA may then perform queries using the company identifier and data type designations to retrieve company-type profile data 1205. In one implementation, company-type profile data may comprise data type values in a data type vector from a term tensor associated with the company. An example of company-type profile data is U.S. dollar values associated with the company. A determination may be made as to whether one or more of the plurality of companies have no association with the selected data types (e.g., no associated data type values for those data types) 1210. If that such a lack of association is detected, the GDMA may set company-type profile values to default and/or null values (e.g., all set to 0) 1215. The GDMA may then perform an overlap-sum of company-type profiles data to generate intercompany similarity values 1220. In one implementation, an overlap-sum of company-type similarity values may be determined as an inner product, dot product, sum of component products, and/or the like of data type vectors associated with each pair of companies and/or company term tensors. The GDMA may then perform a wide variety of different actions with the determined similarity values. For example, in one implementation, the GDMA may store intercompany similarity values, such as in association with company names and/or other company identifiers, a session identifier, and/or the like 1225. In another implementation, the GDMA may generate one or more reports of intercompany similarity values 1230, such as may be printed, published to a website, provided as a data feed, and/or the like. In another implementation, the GDMA may perform one or more further actions based on intercompany values 1235, such as, but not limited to: trading a financial security associated with one company based on its similarity to another; generating and submitting a communication to a first company based on its similarity to another company; placing an order, and/or otherwise transacting business, with a first company based on its similarity to a second company; and/or the like.

In another embodiment, if two companies have vector types that are identical, then they can be compared as in FIG. 5C. In addition, where two companies have similar type vectors, additional phrases associated with the data in those type vectors may be employed to constrain the data in those type vectors, such that only that data in the same vector type that is also contextually related to the same constraining terms is included in the comparison determination and/or calculation. For example, if Organization A and Organization B both have data of the vector type "gram" and "cobalt" is determined to be a term which is contextually related to some of the data in each of the vector types, then the vector types of type gram for Organization A and Organization B may be filtered to only include those data values that are also found in the corpus to be contextually related to "cobalt." Subsequent similarity determination, such as that discussed below, may then be performed on the filtered vector values.

In another embodiment, a single entity may be specified, and the GDMA may automatically determine which if any other entities are similar using one or more methods discussed herein. For example, in one implementation, all type vectors within the associated term tensor for the specified entity may be evaluated with respect to type vectors in the term tensors of other entities to look for overlap (e.g., that exceeds a given threshold).

In another embodiment, no entities are manually provided by a user and, instead, an entity of interest (e.g., based on changes to its term tensor) may be automatically selected and the term tensors of other entities of the same type may be evaluated for similarity as described herein.

Figure 13:
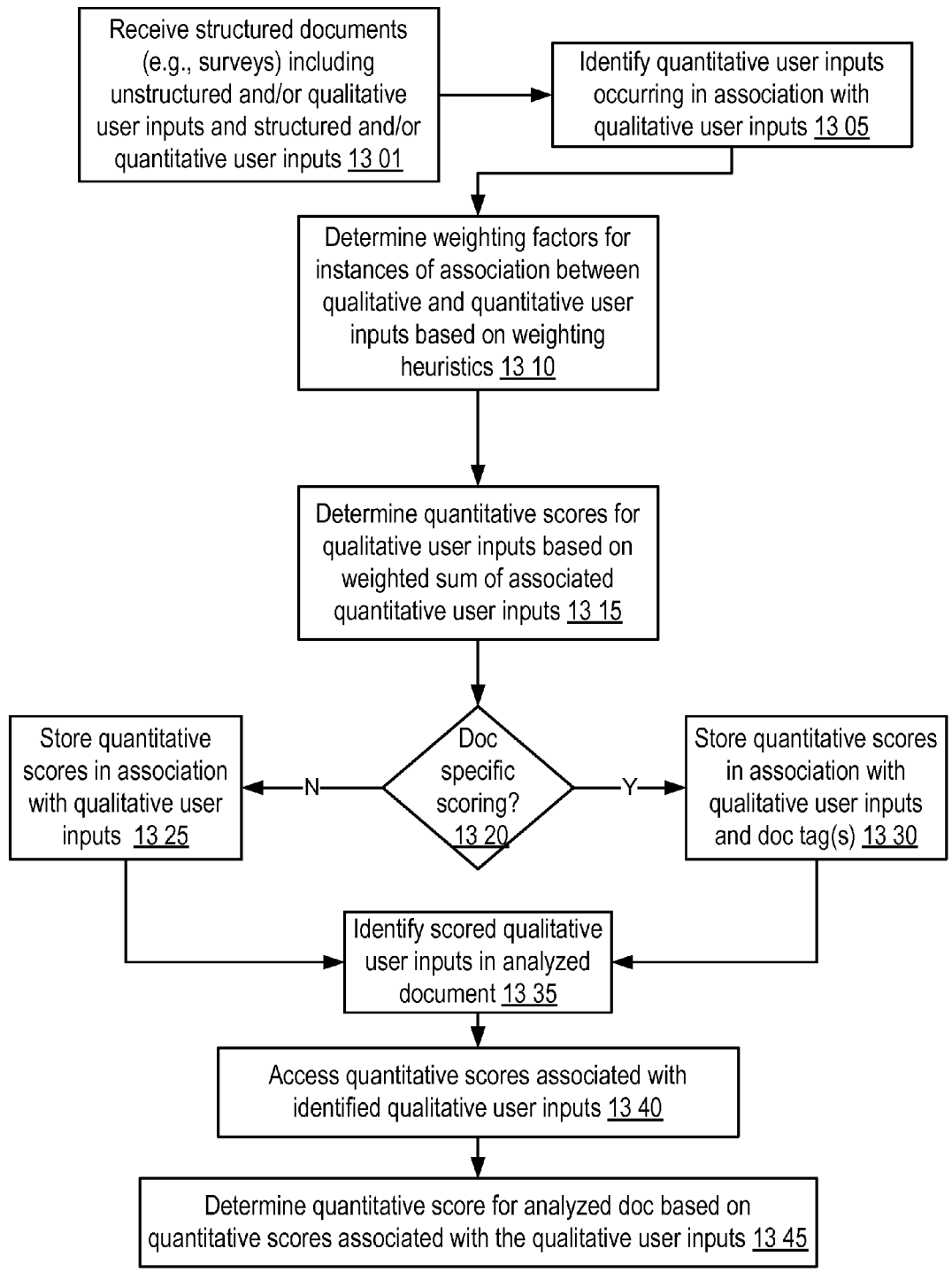
FIG. 13 shows an implementation of logic flow for quantitative sentiment analysis in one embodiment of GDMA operation.

FIG. 13 shows an implementation of logic flow for quantitative sentiment analysis in one embodiment of GDMA operation. In various implementations, the GDMA may be configured to evaluate a corpus of structured or semi-structured electronic documents and/or data in order to correlate qualitative sentiment signifiers with quantitative values. That correlation may then be exploited to assign quantitative values to unstructured documents containing the same qualitative sentiment signifiers. The GDMA may receive structured documents (e.g., such as surveys) that include unstructured and/or qualitative user inputs, comprising sentiment signifiers, together with structured and/or quantitative user inputs 1301. For example, a customer satisfaction survey may ask a customer to provide both a quantitative score for various aspects of the customer experience as well as free-form descriptions and/or freely chosen keywords that the customer believes characterize his or her experience. Associations between the quantitative inputs and qualitative sentiment signifiers may be identified 1305, such as based on occurrence within the same document, occurrence within a specified distance from each other within a given document, and/or the like. In one implementation, the GDMA may further determine one or more weighting factors for instances of association between quantitative inputs and sentiment signifiers based on one or more weighting heuristics 1310, such as, but not limited to, those examples shown in FIGS. 4A-4B. Quantitative scores for association with qualitative sentiment signifiers may then be determined as a weighted sum of associated quantitative inputs 1315. A determination may be made as to whether or not the scoring scheme determined at 1315 is document specific 1320. If so, the GDMA may store the determined quantitative scores in association with qualitative user inputs and document tags and/or identifiers 1330. Otherwise, if the scoring scheme is not document specific, then the GDMA may store determined quantitative scores in association with the qualitative user inputs 1325 without reference to document tags and/or identifiers.

When presented a document for quantitative sentiment analysis, the GDMA may identify scored qualitative user inputs in the document 1335 and access quantitative scores associated with those qualitative inputs 1340 and/or with the type of document being analyzed. The GDMA may then, in one implementation, determine an overall quantitative score for the document based on the quantitative scores associated with each of the qualitative user inputs contained therein 1345. For example, in one implementation, a document's quantitative score may be determined as a linear sum, weighted sum, and/or the like of quantitative scores associated with qualitative user inputs appearing in that document. In another implementation, qualitative user inputs may be grouped into classes such that only qualitative user inputs within the same class may have their corresponding quantitative scores summed.

In another implementation, the GDMA may be configured to automatically (e.g., without any user inputs) determine the phrases with extremal quantitative scores (e.g., at the far end of the spectrum of values), whether positive or negative, and/or with scores that have changed the most in a predetermined period of time.

In another implementation, the quantitative score of a particular phrase may be determined over a time period and/or presented as a plotted time series, such as shown in one implementation in FIG. 10. Such a time series may also be provided to a predictive analytics package, such as to evaluate its correlation with other data patterns, as discussed herein.

Quantitative sentiment analysis such as that described above and/or with reference to FIG. 13, may be employed by the GDMA within a wide variety of different application contexts. For example, in one implementation, the GDMA may employ quantitative sentiment analysis to correlate quantitative pricing information for consumer goods with qualitative consumer entries in consumer satisfaction surveys. Such correlations may be employed to inform future product pricing, such as by assigning prices based on focus group comments for new products. In another example, the GDMA may correlate pricing information for financial securities with various cues in financial analyst commentary, and evaluate subsequent commentary to predict future price values for securities to which that commentary is pertinent. In yet another example, the GDMA may establish an automatic grading system by analyzing graded, rated, ranked, and/or the like documents to correlate those grades with the qualitative and/or unstructured content of those documents. The GDMA may then analyze the content of future documents in order to automatically assign a grade, rating, rank, and/or the like thereto. In yet another example, the GDMA may establish an intellectual property and/or creative content valuation tool by correlating sale prices for patents, copyrighted materials, manuscripts, plays, poems, songs, contracts, and/or the like with the content of those documents. A subsequent patent, copyrighted material, manuscript, play, poem, song, contract, and/or the like may then be valued based on the analyzed content of the documents in view of correlated pricing information. It is to be understood that the applications of the GDMA's quantitative sentiment analysis features discussed herein are for illustrative purposes only, and the GDMA's quantitative sentiment analysis features may be configured for a wide variety of other applications as well.

Figure 14:
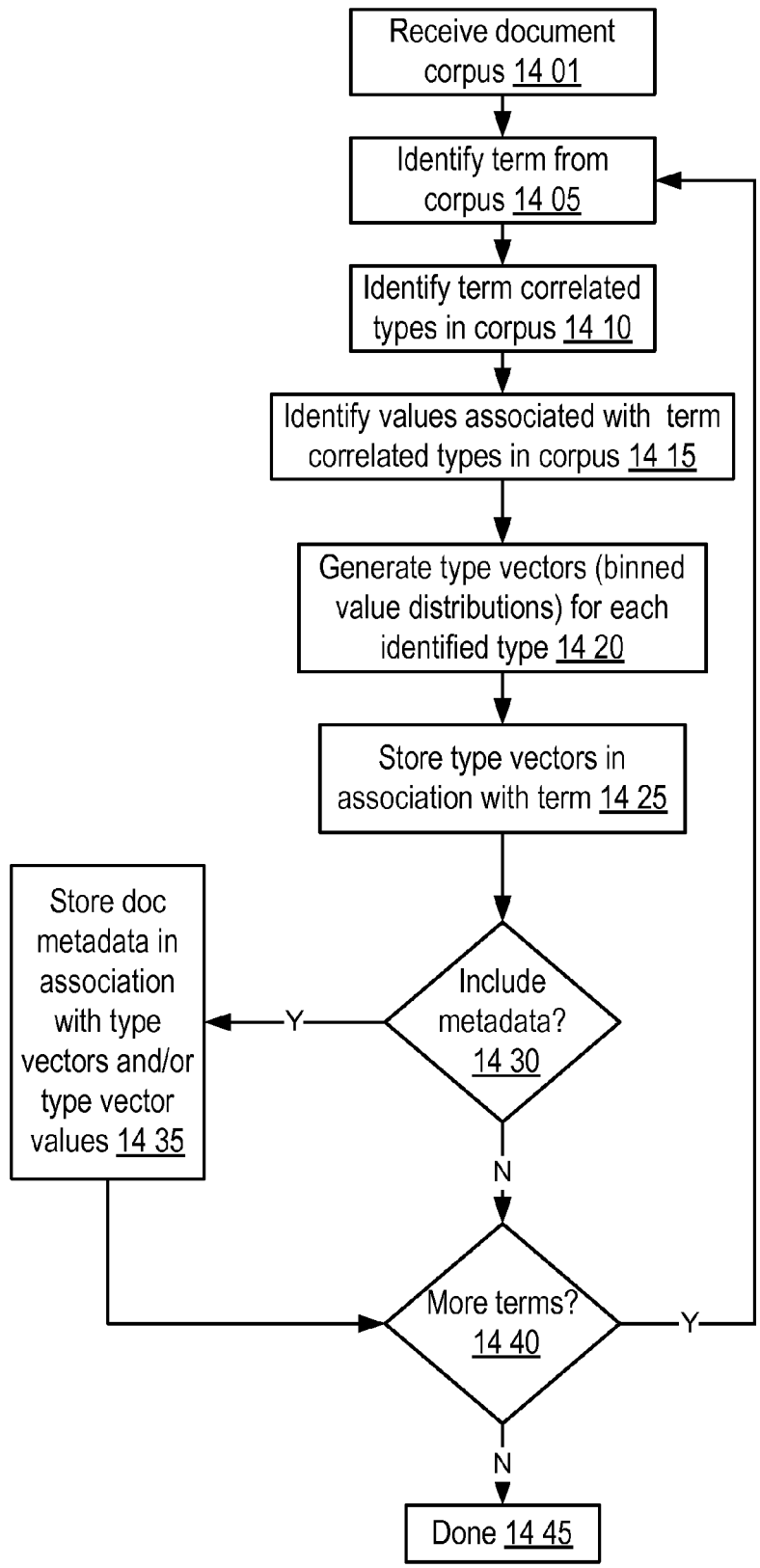
FIG. 14 shows an implementation of logic flow for term tensor generation in one embodiment of GDMA operation.

FIG. 14 shows an implementation of logic flow for term tensor generation in one embodiment of GDMA operation. In one implementation, a flow similar to the example shown in FIG. 14 may be employed by the GDMA to establish and/or generate one or more term tensors such as those illustrated schematically in FIGS. 5A-5D. A corpus of electronic documents, such as word processing documents, spreadsheets, database records and/or tables, web form entries, HTML documents, XML documents, and/or the like may be received 1401. The GDMA may identify a term from the document corpus 1405, and then identify data types 1410 and data type values 1415 associated therewith, as discussed previously. Type vectors for each correlated data type, comprising corresponding correlated data type values, may then be generated for each identified data type 1420. In one implementation, correlated data type values may be binned for data type vector generation. Generated type vectors may then be stored in association with the term 1425, forming a term tensor. A determination may be made as to whether document metadata is to be included and/or linked to data in the term tensor 1430. If so, such metadata may be stored in association with the term tensor, type vectors, and/or type vector values 1435. Examples of such document metadata may include, but are not limited to, document identifier, document type identifier, date and/or time of creation, snippet, author, and/or the like. A determination may be made as to whether there are further terms to analyze in the document corpus 1440 and, if so, then the GDMA may return to 1405 to identify new and/or additional terms. Otherwise, the term tensor generation flow may conclude 1445.

Figure 15:
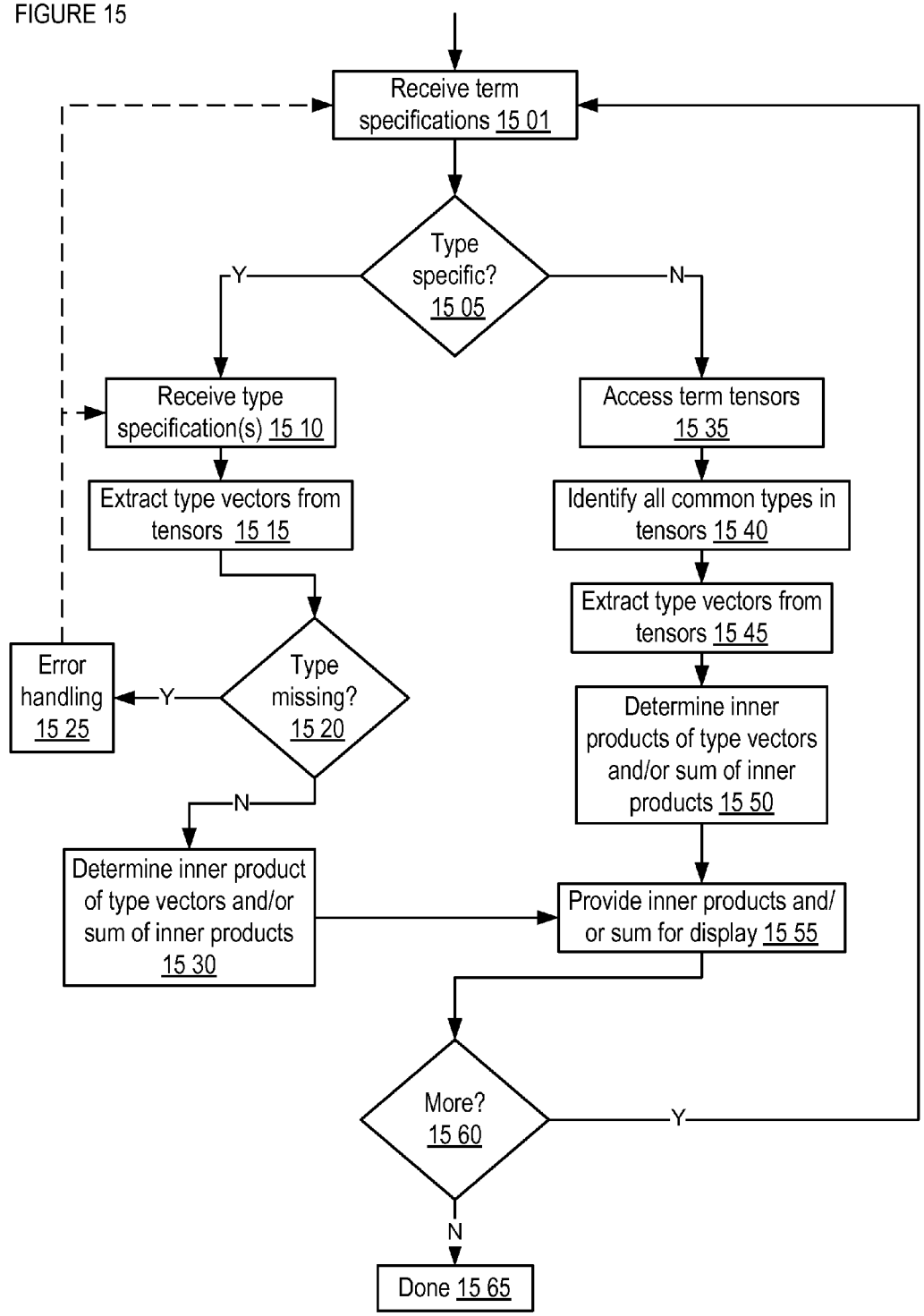
FIG. 15 shows an implementation of logic flow for similarity determination in one embodiment of GDMA operation.

FIG. 15 shows an implementation of logic flow for similarity determination in one embodiment of GDMA operation. Like the similarity determination shown in an alternative implementation in FIG. 12, the similarity determination implementation shown in FIG. 15 allows the GDMA to compare two or more entities along one or more bases for comparison. One or more term specifications may be received 1501, identifying the two or more entities to be compared. For example, received terms may comprise identifiers of two or more people, companies, organizations, documents, products, places, times, and/or the like. A determination may be made as to whether or not the entity comparison is to be data type specific 1505. If so, one or more data type specifications may be received 1510 and the type vectors corresponding to those specifications may be extracted from term tensors corresponding to each of the entities to be compared 1515. A determination may be made as to whether one or both of the term tensors are missing a type vector for the entered data type 1520. If so, an error handling procedure may be undertaken, such as setting type values to default and/or null values, providing an error message to the user, requesting reentry of data type specifications, requesting reentry of term specifications, and/or the like 1525. If no types are missing, the GDMA may evaluate an inner product for extracted data type vectors 1530 in order to determine the entity similarities, and may provide determined inner products and/or values derived therefrom for display 1555.

If the comparison is determined to not be type-specific at 1505, the GDMA may access term tensors corresponding to each of the entities to be compared 1535 and may identify all common data types between the two tensors 1540. Type vectors for those common data types may be extracted 1545, and inner products may be evaluated for each pair of common type vectors extracted from each entity term tensor 1550. In one implementation, the GDMA may sum all data type vector inner products to obtain an overall similarity score for the entity comparison. Data type inner products and/or an overall similarity score may then be provided for display 1555. A determination may be made as to whether further comparisons are desired 1560 and, if so, the GDMA may return to 1501 to receive further term specifications. Otherwise, the entity comparison flow may conclude 1565.

Figure 16:
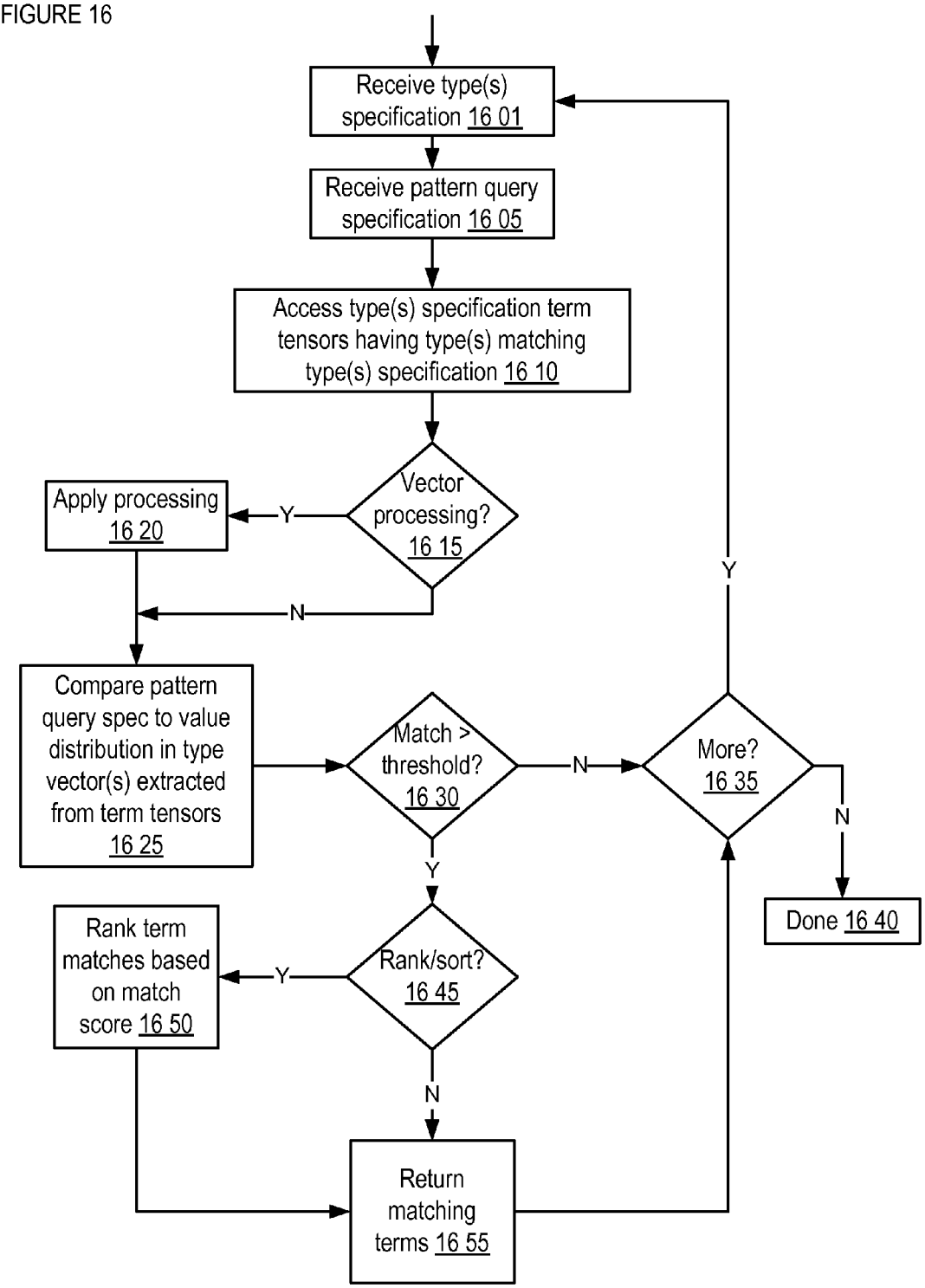
FIG. 16 shows an implementation of logic flow for pattern-based searching in one embodiment of GDMA operation.

FIG. 16 shows an implementation of logic flow for pattern-based searching in one embodiment of GDMA operation. The GDMA may be configured, in various implementations, to admit specification of a data type value pattern as a query input, and to identify terms having data type value patterns matching that input. This query input may be provided by a user and/or may be automatically provided, such as by being drawn from a library of defined patterns. A data type specification 1601 and pattern query specification may be received 1605. A pattern query specification may, for example, comprise a value, collection and/or range of values, functional form, curve fit, and/or the like. The GDMA may then access type specification term tensors 1610, comprising term tensors that include type vectors for data types matching the data type specifications received at 1601. A determination may be made as to whether any processing of data type vectors in accessed term tensors is needed or desired 1615 and, if so, such processing is applied 1620. For example, if a pattern query specification comprises a functional form, the GDMA may perform smoothing, averaging, curve fitting, regression analysis, and/or the like on accessed data type values in order to facilitate comparison with the pattern query specification. The GDMA may then compare the pattern query specification to data type values and/or value distributions in data type vectors extracted from the accessed term tensors 1625. Comparison of pattern query specification and data type values may be performed in a variety of different ways in various implementations, such as may depend, in one implementation, on the nature of the pattern query specification. For example, if the pattern query specification comprises a curve, the GDMA may determine a difference between that curve and a fit curve to data type values, and then evaluate an integral of the difference, or other such metric, over a relevant range. A determination may be made as to whether a match score is greater than a threshold value 1630 (e.g., if the difference is less than a threshold value). If so, then a determination may be made as to whether the matching results are to be ranked and/or sorted 1645. If so, then terms may be ranked based on match scores of their associated data type vectors to the pattern query specification 1650. Matching terms, whether sorted or not, may be returned and/or provided for display 1655. A determination may be made as to whether further searching is desired and, if so, the GDMA may return to 1601 to receive further data type specifications. Otherwise, the pattern-based searching flow may conclude 1640.

In one implementation, term tensors may also be calculated for and/or associated with individual documents. In such an implementation, document term tensors may be used to calculate the overlap and/or similarity between two documents. Term tensors for individual documents, for the entire corpus, for some fraction and/or subset of the corpus, and/or the like may be stored in hot cache rather than storing the entire document corpus, thereby reducing data storage requirements.

GDMA Controller

Figure 17:
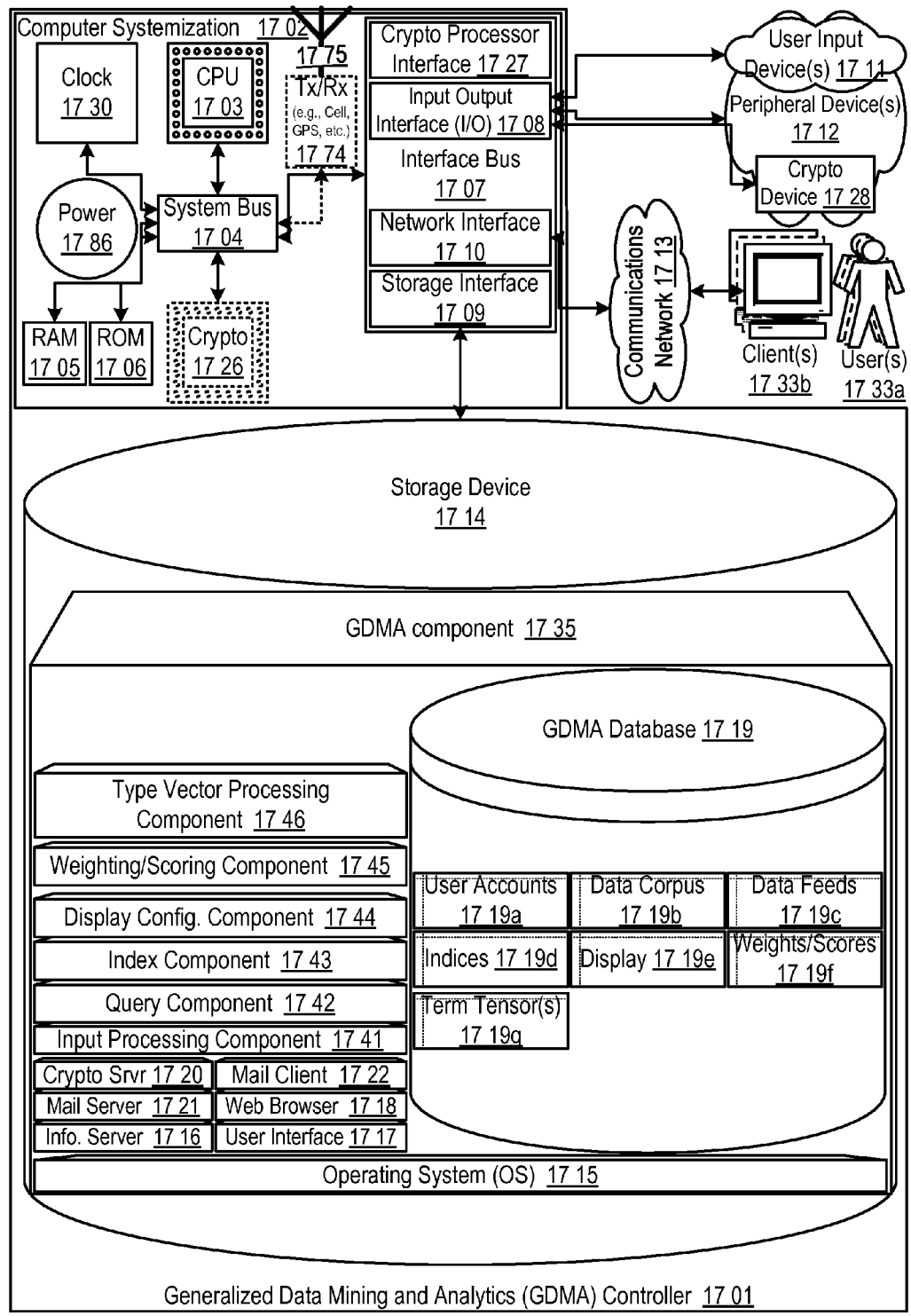
FIG. 17 shows a block diagram illustrating embodiments of a GDMA controller.

FIG. 17 shows a block diagram illustrating embodiments of a GDMA controller. In this embodiment, the GDMA controller 1701 may serve to aggregate, process, store, search, serve, identify, instruct, generate, match, and/or facilitate interactions with a computer through unstructured data processing and generalized information retrieval, data mining and analytics, and/or the like technologies, and/or other related data.

Typically, users, which may be people and/or other systems, may engage information technology systems (e.g., computers) to facilitate information processing. In turn, computers employ processors to process information; such processors 1703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the GDMA controller 1701 may be connected to and/or communicate with entities such as, but not limited to: one or more users from user input devices 1711; peripheral devices 1712; an optional cryptographic processor device 1728; and/or a communications network 1713.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The GDMA controller 1701 may be based on computer systems that may comprise, but are not limited to, components such as: a computer systemization 1702 connected to memory 1729.

Computer Systemization

A computer systemization 1702 may comprise a clock 1130, central processing unit ("CPU(s)" and/or "processor(s)" (these terms are used interchangeable throughout the disclosure unless noted to the contrary)) 1703, a memory 1729 (e.g., a read only memory (ROM) 1706, a random access memory (RAM) 1705, etc.), and/or an interface bus 1707, and most frequently, although not necessarily, are all interconnected and/or communicating through a system bus 1704 on one or more (mother)board(s) 1702 having conductive and/or otherwise transportive circuit pathways through which instructions (e.g., binary encoded signals) may travel to effectuate communications, operations, storage, etc. The computer systemization may be connected to a power source 1786; e.g., optionally the power source may be internal. Optionally, a cryptographic processor 1726 and/or transceivers (e.g., ICs) 1774 may be connected to the system bus. In another embodiment, the cryptographic processor and/or transceivers may be connected as either internal and/or external peripheral devices 1712 via the interface bus I/O. In turn, the transceivers may be connected to antenna(s) 1775, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing GDMA controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1729 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the GDMA controller and beyond through various interfaces. Should processing requirements dictate a greater amount speed and/or capacity, distributed processors (e.g., Distributed GDMA), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the GDMA may be achieved by implementing a microcontroller such as CAST's R8051XC2 microcontroller; Intel's MCS 51 (i.e., 8051 microcontroller); and/or the like. Also, to implement certain features of the GDMA, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the GDMA component collection (distributed or otherwise) and/or features may be implemented via the microprocessor and/or via embedded components; e.g., via ASIC, coprocessor, DSP, FPGA, and/or the like. Alternately, some implementations of the GDMA may be implemented with embedded components that are configured and used to achieve a variety of features or signal processing.

Depending on the particular implementation, the embedded components may include software solutions, hardware solutions, and/or some combination of both hardware/software solutions. For example, GDMA features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the GDMA features. A hierarchy of programmable interconnects allow logic blocks to be interconnected as needed by the GDMA system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the GDMA may be developed on regular FPGAs and then migrated into a fixed version that more resembles ASIC implementations. Alternate or coordinating implementations may migrate GDMA controller features to a final ASIC instead of or in addition to FPGAs. Depending on the implementation all of the aforementioned embedded components and microprocessors may be considered the "CPU" and/or "processor" for the GDMA.

Power Source

The power source 1786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1786 is connected to at least one of the interconnected subsequent components of the GDMA thereby providing an electric current to all subsequent components. In one example, the power source 1786 is connected to the system bus component 1704. In an alternative embodiment, an outside power source 1786 is provided through a connection across the I/O 1708 interface. For example, a USB and/or IEEE 1394 connection carries both data and power across the connection and is therefore a suitable source of power.

Interface Adapters

Interface bus(ses) 1707 may accept, connect, and/or communicate to a number of interface adapters, conventionally although not necessarily in the form of adapter cards, such as but not limited to: input output interfaces (I/O) 1708, storage interfaces 1709, network interfaces 1710, and/or the like. Optionally, cryptographic processor interfaces 1727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1709 may accept, communicate, and/or connect to a number of storage devices such as, but not limited to: storage devices 1714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1710 may accept, communicate, and/or connect to a communications network 1713. Through a communications network 1713, the GDMA controller is accessible through remote clients 1733b (e.g., computers with web browsers) by users 1733a. Network interfaces may employ connection protocols such as, but not limited to: direct connect, Ethernet (thick, thin, twisted pair 1000000 Base T, and/or the like), Token Ring, wireless connection such as IEEE 802.11a-x, and/or the like. Should processing requirements dictate a greater amount speed and/or capacity, distributed network controllers (e.g., Distributed GDMA), architectures may similarly be employed to pool, load balance, and/or otherwise increase the communicative bandwidth required by the GDMA controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1710 may be used to engage with various communications network types 1713. For example, multiple network interfaces may be employed to allow for the communication over broadcast, multicast, and/or unicast networks.

Input Output interfaces (I/O) 1708 may accept, communicate, and/or connect to user input devices 1711, peripheral devices 1712, cryptographic processor devices 1728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1711 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1712 may be connected and/or communicate to I/O and/or other facilities of the like such as network interfaces, storage interfaces, directly to the interface bus, system bus, the CPU, and/or the like. Peripheral devices may be external, internal and/or part of the GDMA controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the GDMA controller may be embodied as an embedded, dedicated, and/or monitor-less (i.e., headless) device, wherein access would be provided over a network interface connection.

Cryptographic units such as, but not limited to, microcontrollers, processors 1726, interfaces 1727, and/or devices 1728 may be attached, and/or communicate with the GDMA controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1729. However, memory is a fungible technology and resource, thus, any number of memory embodiments may be employed in lieu of or in concert with one another. It is to be understood that the GDMA controller and/or a computer systemization may employ various forms of memory 1729. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1729 will include ROM 1706, RAM 1705, and a storage device 1714. A storage device 1714 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1729 may contain a collection of program and/or database components and/or data such as, but not limited to: operating system component(s) 1715 (operating system); information server component(s) 1716 (information server); user interface component(s) 1717 (user interface); Web browser component(s) 1718 (Web browser); database(s) 1719; mail server component(s) 1721; mail client component(s) 1722; cryptographic server component(s) 1720 (cryptographic server); the GDMA component(s) 1735; and/or the like (i.e., collectively a component collection). These components may be stored and accessed from the storage devices and/or from storage devices accessible through an interface bus. Although non-conventional program components such as those in the component collection, typically, are stored in a local storage device 1714, they may also be loaded and/or stored in memory such as: peripheral devices, RAM, remote storage facilities through a communications network, ROM, various forms of memory, and/or the like.

Operating System

The operating system component 1715 is an executable program component facilitating the operation of the GDMA controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Nan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the GDMA controller to communicate with other entities through a communications network 1713. Various communication protocols may be used by the GDMA controller as a subcarrier transport mechanism for interaction, such as, but not limited to: multicast, TCP/IP, UDP, unicast, and/or the like.

Information Server

An information server component 1716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the GDMA controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the GDMA database 1719, operating systems, other program components, user interfaces, Web browsers, and/or the like.

Access to the GDMA database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the GDMA. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the GDMA as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1718 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the GDMA enabled nodes. The combined application may be nugatory on systems employing standard Web browsers.

Mail Server

A mail server component 1721 is a stored program component that is executed by a CPU 1703. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP$_3$), simple mail transfer protocol (SMTP), and/or the like. The mail server can route, forward, and process incoming and outgoing mail messages that have been sent, relayed and/or otherwise traversing through and/or to the GDMA.

Access to the GDMA mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1722 is a stored program component that is executed by a CPU 1703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP$_3$, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1720 is a stored program component that is executed by a CPU 1703, cryptographic processor 1726, cryptographic processor interface 1727, cryptographic processor device 1728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the GDMA may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/ or facilities of the like. The cryptographic component supports encryption schemes allowing for the secure transmission of information across a communications network to enable the GDMA component to engage in secure transactions if so desired. The cryptographic component facilitates the secure accessing of resources on the GDMA and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The GDMA Database

The GDMA database component 1719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the GDMA database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the GDMA database is implemented as a data-structure, the use of the GDMA database 1719 may be integrated into another component such as the GDMA component 1735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1719 includes several tables 1719a-g. A user accounts table 1719a may include fields such as, but not limited to: user_ID, name, login, password, contact_info, query_history, settings, preferences, and/or the like. The user accounts table may support and/or track multiple entity accounts on a GDMA. A data corpus table 1719b may include fields such as, but not limited to: corpus_ID, document_ID(s), document_name(s), document_type(s), source, author, date, document_content, document_metadata, and/or the like. A data feeds table 1719c may include fields such as, but not limited to: data_feed_ID, data_feed_name, data_feed_type, data_feed_content, source, author, date, data_feed_metadata, and/or the like. In one implementation, the data feed table may be populated by a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi. An indices table 1719d may include fields such as, but not limited to: index_ID, index_type, corpus_ID, document_ID(s), data_feed_ID(s), term(s), data_type(s), data_type value(s), snippet(s), source(s), author(s), date(s), and/or the like. A display table 1719e may include fields such as, but not limited to: display_ID, display_configuration, settings, preferences, user_ID(s), and/or the like. A weights/scores table 1719f may include fields such as, but not limited to: weight_ID, weight_value, document_ID(s), correlation, relevance, similarity, and/or the like. A term tensor(s) table 1719g may include fields such as, but not limited to: term_tensor_ID, term, data_type(s), data_type_value(s), snippet(s), document_ID(s), data_feed_ID(s), document_metadata, data_feed_metadata, and/or the like, correlation, relevance, similarity, and/or the like.

In one embodiment, the GDMA database may interact with other database systems. For example, employing a distributed database system, queries and data access by search GDMA component may treat the combination of the GDMA database, an integrated data security layer database as a single database entity.

In one embodiment, user programs may contain various user interface primitives, which may serve to update the GDMA. Also, various accounts may require custom database tables depending upon the environments and the types of clients the GDMA may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1719a-g. The GDMA may be configured to keep track of various settings, inputs, and parameters via database controllers.

The GDMA database may communicate to and/or with other components in a component collection, including itself, and/or facilities of the like. Most frequently, the GDMA database communicates with the GDMA component, other program components, and/or the like. The database may contain, retain, and provide information regarding other nodes and data.

The GDMAs

The GDMA component 1735 is a stored program component that is executed by a CPU. In one embodiment, the GDMA component incorporates any and/or all combinations of the aspects of the GDMA that was discussed in the previous figures. As such, the GDMA affects accessing, obtaining and the provision of information, services, transactions, and/or the like across various communications networks.

The GDMA transforms electronic documents, user query inputs, and data type selections via GDMA input processing component 1741, query component 1742, index component 1743, display configuration component 1744, weighting/scoring component 1745, and type vector processing component 1746 into term tensors, query results, data type value representations, alerts, entity comparisons, quantitative sentiment analysis scoring schemes, transaction instructions, and/or the like outputs.

The GDMA component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the GDMA server employs a cryptographic server to encrypt and decrypt communications. The GDMA component may communicate to and/or with other components in a component collection, including itself, and/or facilities of the like. Most frequently, the GDMA component communicates with the GDMA database, operating systems, other program components, and/or the like. The GDMA may contain, communicate, generate, obtain, and/or provide program component, system, user, and/or data communications, requests, and/or responses.

Distributed GDMAs

The structure and/or operation of any of the GDMA node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the GDMA controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the GDMA controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming
   communication
$sock=socket_create(AF_INET, SOCK_STREAM, 0);
socket_bind($sock, $address, $port) or die('Could not
   bind to address');
socket_listen($sock);
```

```
$client=socket_accept($sock);
// read input data from client device in 1024 byte blocks
    until end of message
do {
    $input="";
    $input=socket_read($client, 1024);
    $data.=$input;
} while($input !="");
// parse data to extract variables
$obj=json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission) VALUES ($data)"); // add data to UserTable table in a CLIENT database
mysql_close("CLIENT_DB.SQL"); // close connection to database ?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?t
opic=/com.ibm.IBMDI.doc/referenceguide295.htm and other parser implementations:

http://publib.boulder.ibm.com/infocenter/tivihelp/v2r1/index.jsp?t
opic=/com.ibm.IBMDI.doc/referenceguide259.htm all of which are hereby expressly incorporated by reference.

In order to address various issues and advance the art, the entirety of this application for GDMA (including the Cover Page, Title, Headings, Field, Background, Summary, Brief Description of the Drawings, Detailed Description, claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a GDMA individual and/or enterprise user, database configuration and/or relational model, data type, data transmission and/or network framework, syntax structure, and/or the like, various embodiments of the GDMA may be implemented that enable a great deal of flexibility and customization. For example, aspects of the GDMA may be adapted for analyzing structured and/or form inputs, data feeds, images, detected and/or recorded sounds, and/or the like. It is to be understood that the embodiments described herein may be readily configured, adapted and/or customized for a wide variety of other implementations and/or document analysis and information retrieval applications.

What is claimed is:

1. A data extraction processor-implemented method, comprising:
    accessing, via a processor, a term tensor associated with at least one term in a corpus of documents,
        wherein the term tensor comprises a plurality of data type vectors corresponding respectively to a plurality of term-correlated data types contextually correlated with the at least one term in the corpus based at least in part on distances between the at least one term and each of the term-correlated data types in the documents, and
        each data type vector comprising a plurality of binned data type values, the plurality of binned data type values comprising a discrete representation of term-correlated data type data associated with the each data type vector and each binned value of the plurality of binned data type values having a corresponding weighted occurrence value derived from the corpus;
    providing, via the processor, at least one of the plurality of term-correlated data types for selectable display;
    receiving, via the processor, at least one term-correlated data type selection; and
    providing, via the processor, a subset of the plurality of binned data type values associated with the at least one term-correlated data type selection for display.

2. The method of claim 1, further comprising:
    receiving the corpus of documents.

3. The method of claim 1, wherein the at least one term is a query term.

4. The method of claim 3, further comprising:
receiving the query term from a user.

5. The method of claim 3, further comprising:
identifying corpus terms having frequency or value different from a historical corpus baseline; and
determining the query term based on identified corpus terms.

6. The method of claim 1, wherein accessing a term tensor further comprises:
querying at least one inverted index based on the at least one term to retrieve term tensor data.

7. The method of claim 6, further comprising:
identifying a query type associated with the at least one query term; and
selecting the at least one inverted index from a plurality of inverted indices based on the query type.

8. The method of claim 1, wherein the at least one query term is a keyword, and the at least one term-correlated data type selection is a unit.

9. The method of claim 8, wherein the plurality of binned data type values comprise discrete numerical values associated with the unit.

10. The method of claim 8, wherein the plurality of binned data type values comprise a set of non-numerical values associated with the unit.

11. The method of claim 1, further comprising:
providing weighted occurrence values corresponding to the data type values for display.

12. The method of claim 1, further comprising:
accessing a second plurality of term-correlated data types correlated with the at least one term-correlated data type selection;
providing the second plurality of term-correlated data types for selectable display;
receiving a second at least one term-correlated data type selection, selected from the second plurality of term-correlated data types; and
providing second data type values associated with the second at least one term-correlated data type selection for display.

13. The method of claim 12, wherein the data type values and second data type values are configured as ordered pairs displayed in an XY data representation.

14. The method of claim 1, further comprising:
receiving at least one alert condition;
updating data type values;
evaluating the at least one alert condition based on updated data type values; and
providing an alert if the at least one alert condition is satisfied.

15. The method of claim 1, wherein the at least one term comprises a first term and a second term, corresponding respectively to a first entity and a second entity, and further comprising:
accessing first data type values associated with the at least one term-correlated data type selection and the first term;
accessing second data type values associated with the at least one term-correlated data type selection and the second term;
determining a similarity between the first entity and the second entity based on the first data type values and the second data type values.

16. The method of claim 15, wherein determining a similarity comprises evaluating a sum of products of first data type values and second data type values.

17. The method of claim 15, wherein determining a similarity further comprises:
performing a normalization operation on at least one of the first data type values and the second data type values.

18. The method of claim 1, wherein the at least one term comprises a first term and a second term, corresponding respectively to a first entity and a second entity, and further comprising:
accessing first data types associated with the first term;
accessing second data types associated with the second term; and
determining a similarity between the first entity and the second entity based on an overlap of the first data types and the second data types.

19. The method of claim 1, wherein the weighted occurrence values are determined as a sum of weights for each occurrence of the data type values in the electronic document corpus.

20. The method of claim 1, wherein the plurality of binned data type values and corresponding weighted occurrences are provided for display in a histogram data representation.

21. The method of claim 1, wherein the plurality of binned data type values include both numerical and non-numerical values.

22. The method of claim 1, wherein the plurality of data type values are time-resolved.

23. The method of claim 1, wherein corresponding weighted occurrences are linked to document metadata.

24. A data extraction apparatus, comprising:
a memory;
a processor disposed in communication with the memory and configured to execute a plurality of processing instructions stored in the memory, wherein the processor executes instructions to:
access a term tensor associated with the at least one term in a corpus of documents,
wherein the term tensor comprises a plurality of data type vectors corresponding respectively to a plurality of term-correlated data types contextually correlated with the at least one term in the corpus based at least in part on distances between the at least one term and each of the term-correlated data types in the documents, and
each data type vector comprising a plurality of binned data type values, the plurality of binned data type values comprising a discrete representation of term-correlated data type data associated with the each data type vector and each binned value of the plurality of binned data type values having corresponding weighted occurrence value derived from the corpus;
provide at least one of the plurality of term-correlated data types for selectable display;
receive at least one term-correlated data type selection; and
provide a subset of the plurality of binned data type values associated with the at least one term-correlated data type selection for display.

25. A non-transitory, machine-readable medium, comprising:
a plurality of processing instructions stored in the medium and issuable by a processor to:
access a term tensor associated with the at least one term in a corpus of documents,
wherein the term tensor comprises a plurality of data type vectors corresponding respectively to a plurality of term-correlated data types contextually correlated with the at least one term in the corpus based at least in part on distances between the at least one term and each of the term-correlated data types in the documents, and each data type vector comprising a plurality of binned data type values, the plurality of binned data type values comprising a discrete representation of term-correlated data type data associated with each data type vector and each binned value of the plurality of binned data type values having corresponding weighted occurrence value derived from the corpus;

provide at least one of the plurality of term-correlated data types for selectable display;

receive at least one term-correlated data type selection; and provide a subset of the plurality of binned data type values associated with the at least one term-correlated data type selection for display.

* * * * *